United States Patent [19]

Rogers

[11] 4,404,685
[45] Sep. 13, 1983

[54] FREQUENCY CONTROL SYSTEM FOR RADIO APPARATUS EMPLOYING FILTER AMPLIFIER OPERATED AT HARMONIC OF FREQUENCY OF SYNTHESIZED SIGNAL SOURCE

[75] Inventor: Noel A. Rogers, Shawnee Mission, Kans.

[73] Assignee: Terra Corporation, Albuquerque, N. Mex.

[21] Appl. No.: 314,717

[22] Filed: Oct. 26, 1981

[51] Int. Cl.³ .............................................. H04B 1/40
[52] U.S. Cl. ......................................... 455/76; 455/77
[58] Field of Search .................................. 455/75–79, 455/86, 183

[56] References Cited

U.S. PATENT DOCUMENTS

| | | | |
|---|---|---|---|
| 3,696,422 | 10/1972 | Burrell | 455/76 |
| 4,035,727 | 7/1977 | Ishii | 455/76 |
| 4,162,447 | 7/1979 | Teshirogi et al. | 455/77 |
| 4,186,343 | 1/1980 | Kakigi | 455/76 |
| 4,247,951 | 1/1981 | Hattori et al. | 455/77 |
| 4,254,504 | 3/1981 | Lewis | 455/76 |

OTHER PUBLICATIONS

"Synthesized FM Transceiver-1" by Forrester, Wireless World, Nov. 1977, vol. 83, #1503.

Primary Examiner—Jin F. Ng
Attorney, Agent, or Firm—Schmidt, Johnson, Hovey & Williams

[57] ABSTRACT

An improved frequency control system for radio apparatus is provided, which is especially advantageous for employment in portable, battery powered, multichannel, radio transceivers. The system involves both individual and combinational type improvements relating to the constructional and operational aspects of transceiver equipment. Some salient features of the system include digital frequency synthesizer circuitry having a frequency and phase locked loop employing a voltage controlled oscillator, out-of-band selection detecting and transmit inhibit signal generating circuitry, and filtering and amplifying circuitry employing voltage controlled tuning and improved wide-band inter-stage coupling for supplying frequency controlling signals for both a receiver and a transmitter from a common excitation source.

7 Claims, 9 Drawing Figures

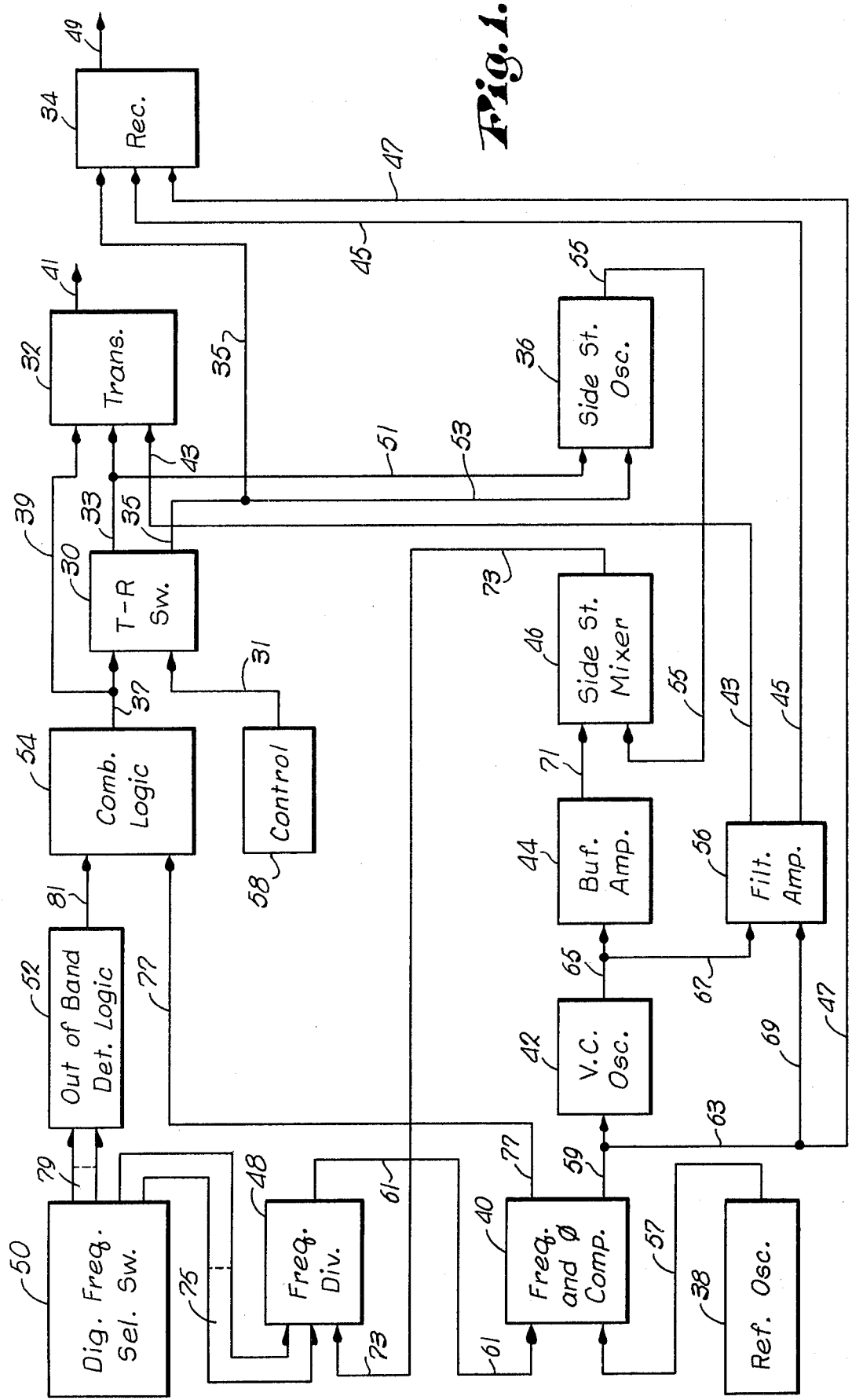

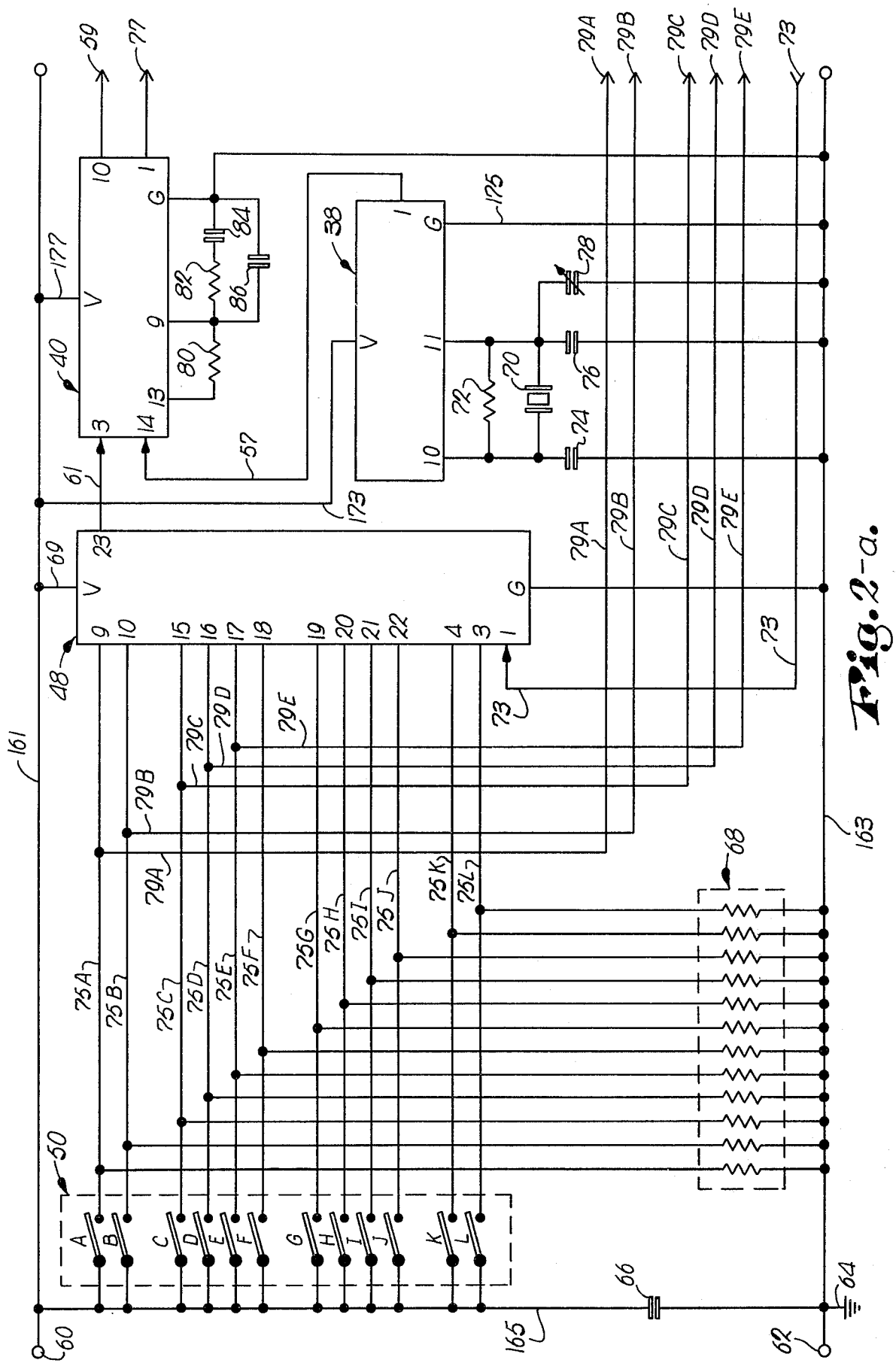
Fig. 2-a.

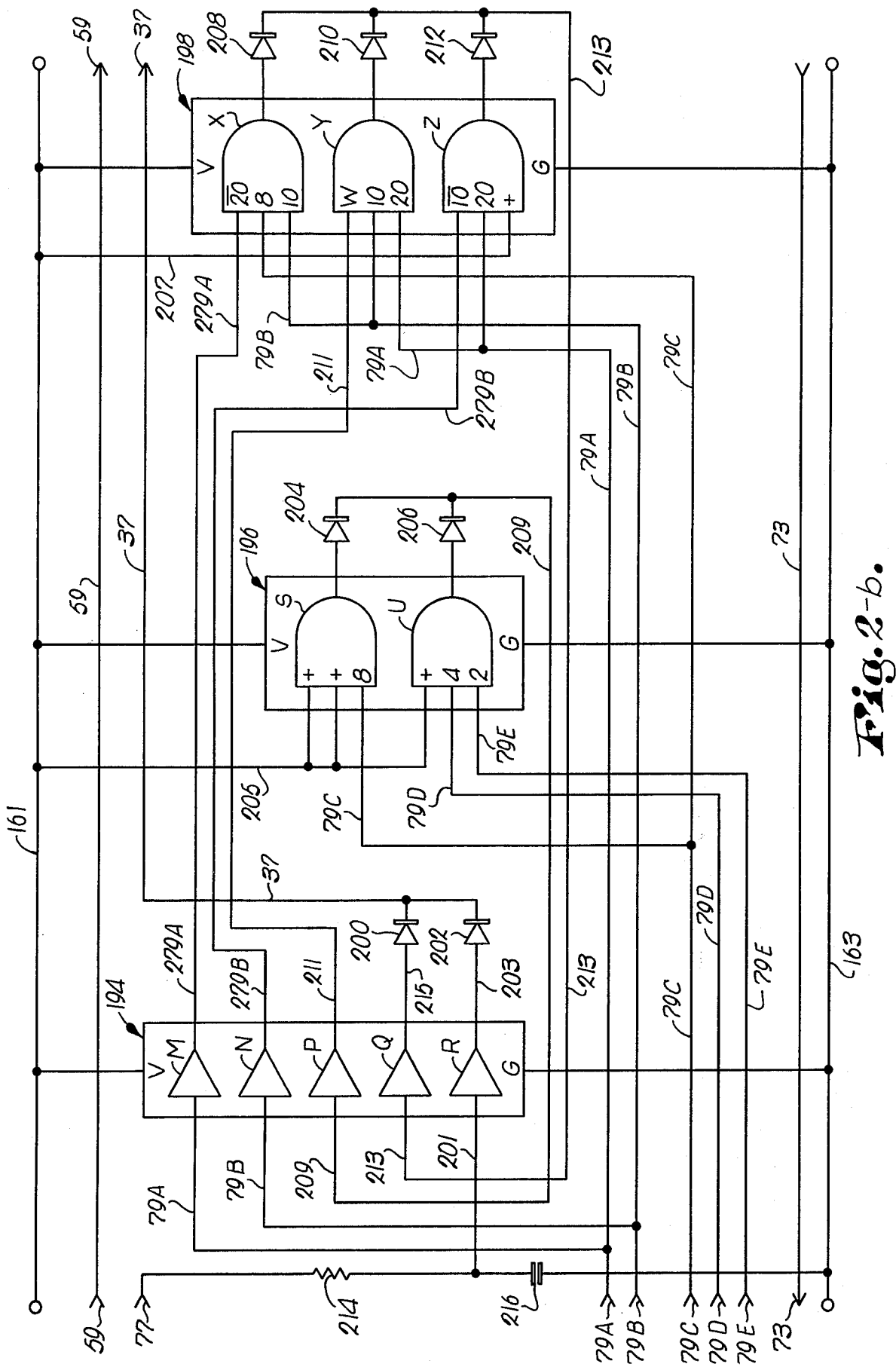
Fig. 2-b.

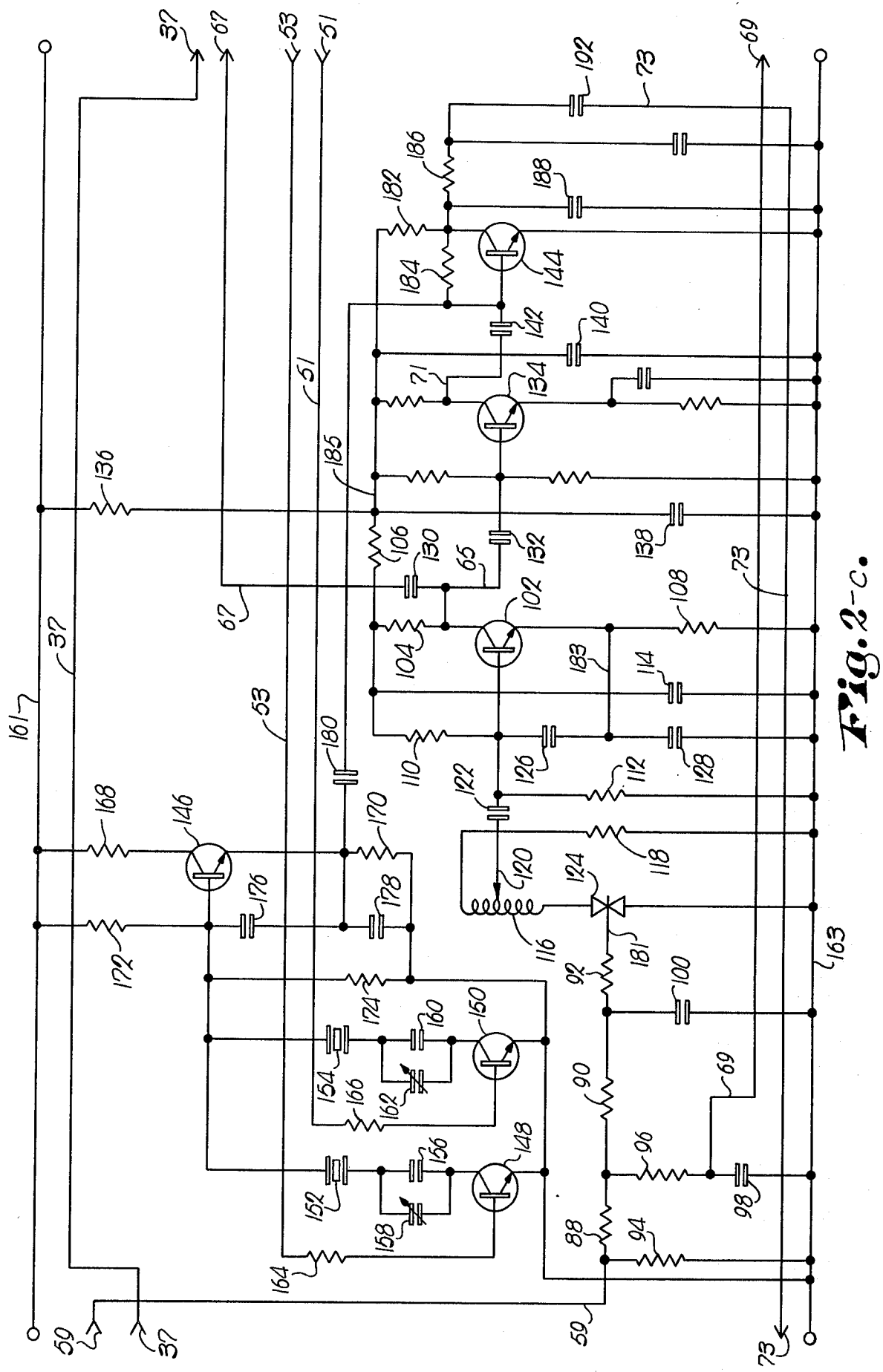
Fig. 2-c.

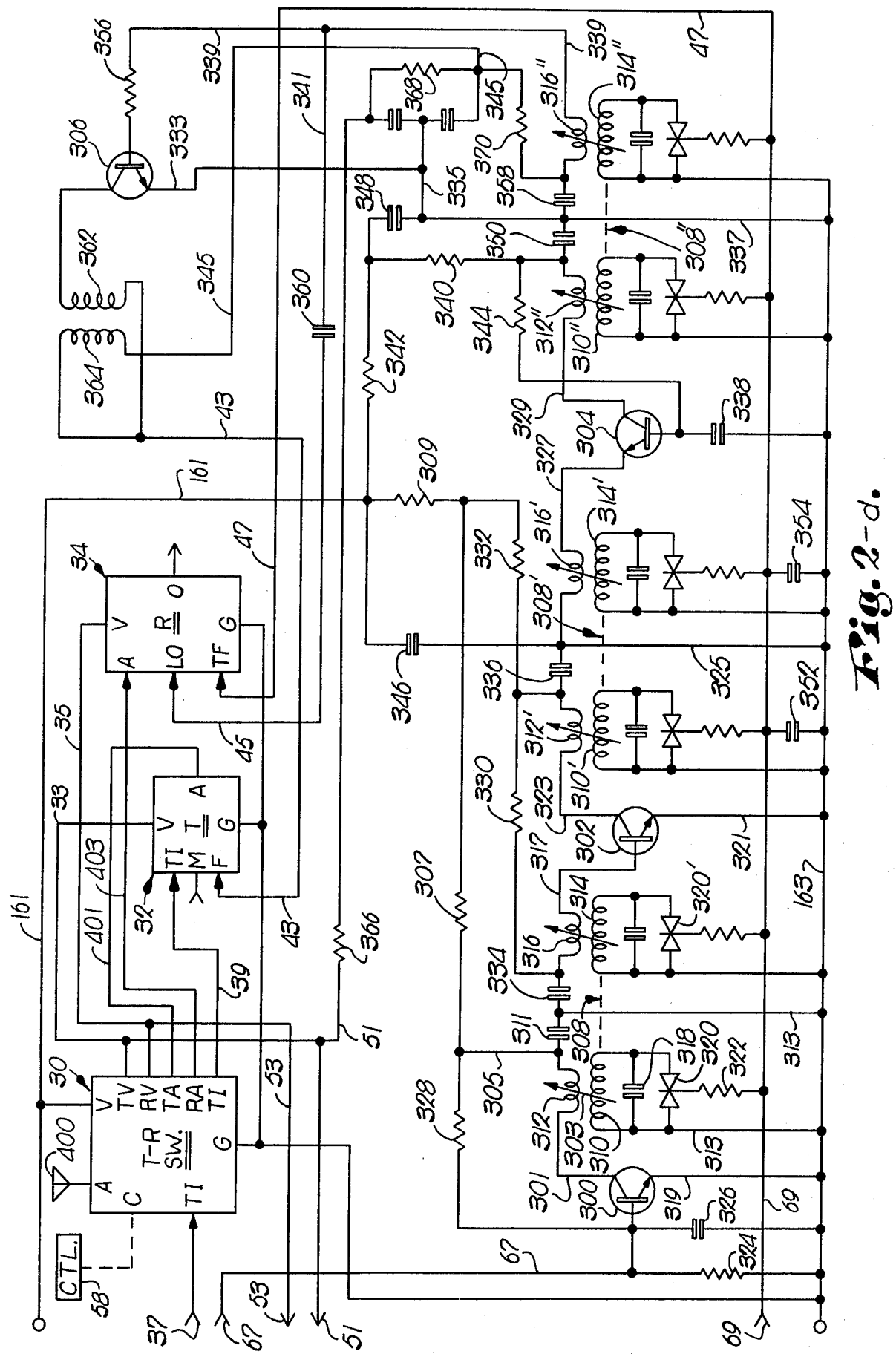
Fig. 2-d.

FREQUENCY CONTROL SYSTEM FOR RADIO APPARATUS EMPLOYING FILTER AMPLIFIER OPERATED AT HARMONIC OF FREQUENCY OF SYNTHESIZED SIGNAL SOURCE

BACKGROUND OF THE INVENTION

1. Field of the Invention

This invention relates to the field of radio receiving and transmitting equipment and especially to the frequency controlling portions of such equipment. In the context of its entirety, the invention is particularly well suited for incorporation into a radio transceiver, such as those employed for receiving aircraft navigation signals and for receiving and transmitting communication signals to and from aircraft; in a more specific context, however, the invention provides a number of improvements also having individual utility in various types of radio equipment generally.

2. Description of the Prior Art

The art of radio receivers, transmitters and transceivers is now a relatively mature one in which most known recent improvements have tended either to narrowly focus upon some isolated specific part of such equipment or to seemingly fall within the category of natural evolutionary conversion of portions of such equipment to employ newly available components for performing the usual functions in what is still essentially the same old way.

It is true, of course, both that (with the exception of the structures utilized to accomplish optimized interstage coupling over an increased bandwidth) this invention intentionally employs modern but commonly available individual components for purposes of economy and employs to a considerable degree classes of individual circuits whose genus is well known (e.g., digital frequency synthesizers, voltage controlled oscillators, tuned active filters, etc.).

However, insofar as is known, neither the involved individual improvements nor the advantageous combination and sub-combinations of same provided by this invention have heretofore been employed or proposed by others. Moreover, it is believed that prior devices have neither achieved the desirable results provided by this invention nor taught that such results should be sought in a similar fashion.

SUMMARY OF THE INVENTION

This invention seeks and is believed to achieve significant over-all improvement in the construction and operation of radio transceiver equipment, and especially with respect to such equipment which needs to be portable, to operate with minimum power requirements, and to function reliably in providing radio communication capabilities upon any of a relatively large number of very high frequency channels of which some may be available for reception only. One application for which the invention is especially suited is in connection with portable, battery powered, aircraft navigation and communications, radio transceiver equipment.

The invention is primarily concerned with improvement of the frequency controlling portions of transceiver equipment and may, therefore, be utilized in conjunction with various types of receiver and transmitter circuits per se. Significant features of the improved frequency controlling system include digital frequency synthesizer circuitry adapted to generate a large number of selectable frequencies at discrete intervals within a wide frequency band, frequency control circuitry implementable with CMOS type solid-state technology to minimize power requirements and thereby render portability practical and incorporating a number of standard integrated circuit assemblies to minimize costs, circuitry for detecting selection of a frequency authorized for reception only or/and a lack of syncronization lock between portions of the frequency synthesizer and for providing a transmission inhibiting signal in response thereto, frequency synthesizer circuitry employing a programmable frequency divider counter controlled by digital frequency selection switches and feeding a frequency and phase comparator also supplied with a reference frequency signal for providing an output for controlling a voltage controlled oscillator operable over a wide frequency range in a signal loop path fed to the programmable divider, filtering and amplifying circuitry providing frequency controlling signals for both a receiver and a transmitter from a single excitation source and employing voltage controlled frequency determining components to optimize frequency tracking, an arrangement for optimizing mutual coupling between radio frequency stages over an increased bandwidth, etc. Further particulars will appear hereinafter.

Radio transceiver equipment incorporating the invention is characterized not only by the desirable operational features provided, but also, because of the manner in which the invention permits such features to be implemented with very low power requirements, by rendering it practical to provide quality transceivers for special purposes (such as reliable aircraft band NAV/COM units that can be powered entirely from internal batteries independent of the electrical system of an aircraft and used even when the latter fails).

BRIEF DESCRIPTION OF THE DRAWINGS

FIG. 1 is a block diagram showing the principal functional parts of a radio transceiver incorporating the invention and the primary signal paths therebetween.

FIG. 2 is a four-sheet, composite, primarily schematic diagram of the transceiver of FIG. 1, wherein certain integrated circuit assemblies are depicted in block form including the more relevant pin numbers of preferred commercial embodiments of such components, the transmitter, receiver and transmit-receive switch modules are depicted in block form, and the remaining components and connections are depicted in conventional electrical and logic schematic form. The four sheets of FIG. 2 are respectively further identified as FIG. 2-a, FIG. 2-b, FIG. 2-c and FIG. 2-d, which it will be understood may essentially be laid end to end, from left to right, in the mentioned order, in order to present the entire diagram constituting the composite FIG. 2.

FIG. 2-a shows further details of the frequency selection switch block, the frequency divider block, the frequency and phase comparator block and the reference oscillator block identified in FIG. 1.

FIG. 2-b shows further details of the out-of-band detection logic block and the combining logic block identified in FIG. 1 for generating the transmit inhibit signal in the event of either out-of-band frequency selection or lack of phase lock.

FIG. 2-c shows further details of the voltage controlled oscillator block, the buffer amplifier block, the side step mixer block and the side step oscillator block identified in FIG. 1.

FIG. 2-d shows further details of the filter amplifier block identified in FIG. 1, as well as the transmit-receive switch, transmitter and receiver modules also identified in FIG. 1.

DESCRIPTION OF THE PREFERRED EMBODIMENT

Preliminary Observations

Figure 3:
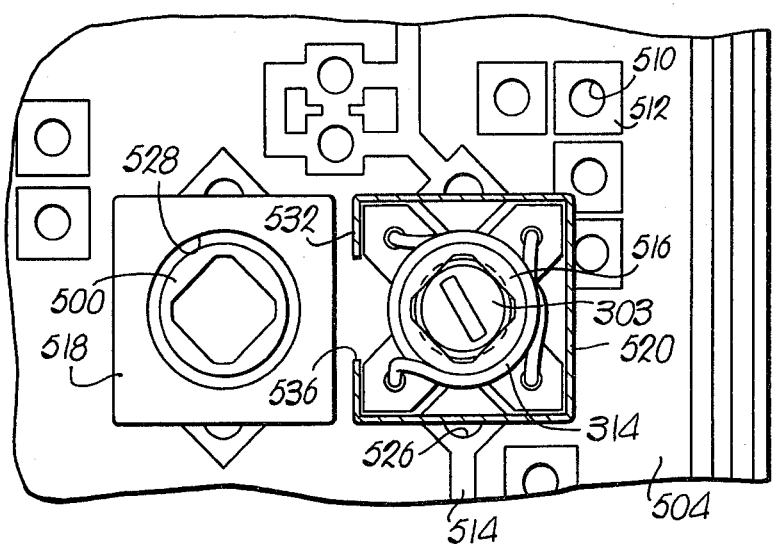
FIG. 3 is a fragmentary, top plan view, with one of the shield cans broken away and shown in cross-section to reveal the internal inductances and their associated parts, showing a portion of a printed circuit board including a pair of radio frequency transformers of the filter amplifier circuitry, which are mutually inductively coupled in the manner contemplated by this invention.

The invention is depicted in the drawings and will be described hereunder with particular reference to its application to a radio transceiver for handling NAV/-COM aircraft band signals, but it is to be understood that this is merely for purposes of illustration and that the invention and various aspects thereof are also applicable to transceivers for other uses and to diverse other types of radio receiving and/or transmitting equipment.

In order to provide some specific frame of reference, as a context for explanation and exemplification of certain frequency relationships and other operational parameters typically involved in utilization of apparatus embodying the invention, however, noting at the outset some such specifics with respect to operation of the aircraft band, NAV/COM transceiver chosen to illustrate a preferred application of the invention may be helpful. The current allocation of authorized radio frequencies for use in providing communications and navigational signals for aircraft is a band from 108.000 MHz through 135.975 MHz, which is regarded as providing 200 navigation signal channels spaced at intervals of 50 KHz (0.050 MHz) and 720 communications channels spaced at intervals of 25 KHz (0.025 MHz). The channels designated for navigation signal purposes are those within the range from 108.000 MHz through 117.950 MHz, while those designated for communications are within the range from 118.000 MHz through 135.975 MHz. Both transmission and reception are permitted between authorized persons on the communications channels, but the navigation signal channels are limited to reception only (in order to avoid interference with the navigation signals being transmitted by designated stations for concurrent reception and use by all interested aircraft).

It may be noted in passing that, presuming that channel selection for the band from 108.000 MHz through 135.975 MHz is to be provided at 25 KHz intervals (although only the 50 KHz spaced channels presently in active use for navigation signals may be currently needed within that portion of the band) on a digitally oriented basis (in terms of frequency), the digital selecting means employed might be expected to actually permit the individual digits of the selected frequency to range from a low setting of "100.000" to a high setting of at least "149.975". Moreover, presuming that control over actual operating frequencies is implemented with a digital frequency synthesizer capable of responding to whatever setting of the digital frequency selecting means may be chosen by the user, it will be apparent that an "out of band" condition may occur with respect to transmission not being permissable, on the selected frequency, not only when the digitally selected frequency setting is within the navigation signal range (108.000 MHz through 117.950 MHz), but also whenever it might be either below or above the NAV/COM band (108.000 MHz through 135.975 MHz). Such widened frequency range of operational capability attending the provision of digital frequency selection and generation is not objectionable from the standpoint of reception and may even be desirable from the standpoint of permitting adaptation (through only minor modification) of a transceiver for use throughout a possibly widened band that might be authorized for aircraft communicatons in the future, but, under present circumstances, it defines a further complication to the out of band transmission problem inherent in NAV/COM transceivers as a result of the prohibition against transmitting on any of the navigation signal channels.

Over-view of Principal Functional Parts

Referring to the functional block diagram of FIG. 1, the radio transceiver illustrating the currently preferred application of the invention will be seen to conventionally include a transmitter module 32, a receiver module 34, a transmit-receive switch module 30, and a means 58 for controlling the operational status of the latter for transmit or receive type operation. With the exception of the provision made for inhibiting transmitting operation in response to selection of a frequency channel for which such operation is not authorized or a loss of frequency/phase lock in the digital synthesizer, which is discussed in greater detail hereinafter, the transmitter 32, receiver 34, T-R switch 30 and control means 58 may each be of various conventional constructions (although implementations with a low current drain type solid state technology to the maximum extent meeting application requirements is preferred in order to minimize the power needed for operation, and the preferred form of receiver 34 utilizes varactor implemented, voltage controlled tuning responsive to a voltage level derived from the improved frequency controlling portions of the apparatus).

The control means 58 shown as operably coupled to the T-R switch 30 as an input connection 31 to the latter may conventionally be a "push to talk" switch on a microphone associated with the transmitter 32, a presence of voice signals responsive switching means ("VOX") or the like. In any event, the T-R switch 30 responds to the control means 58, when the latter is in a condition corresponding to a transmit mode of operation, to normally produce a transmit enable signal upon output line 33 of T-R switch 30, but otherwise applies a receive enable signal to the output line 35 of the T-R switch 30. It will be understood by those skilled in the art that the connection from the T-R switch 30 to the transmitter 32 represented at 33 may control either the coupling of a source of operating power to the transmitter 32, the coupling of an antenna to the transmitter 32 or both; and, similarly, the connection 35 from the T-R switch 30 to the receiver 34 may also represent couplings to portions of the latter of operating power and/or an antenna from which signals are to be received.

With the present invention, the operation of the T-R switch 30 and/or the transmitter 32 are modified by a transmit inhibit signal generated in a manner hereinafter described and depicted in FIG. 1 as optionally connected with both the T-R switch 30 and the transmitter 32 via connections 37 and 39 respectively. The transmit inhibit signal upon line 37 and/or line 39 will be understood to prevent the transmitter 32 from actually generating output signals to be delivered to the antenna via an output connection path 41, even though the T-R switch 30 might otherwise be conditioned by the control means 58 for delivering a transmit enable signal to the transmitter 32 along the connection 33. In the preferred construction, in which the same antenna is alternately employed for both transmitting and receiving, the operation of the T-R switch 30 and any direct connection 39 of the transmit inhibit signal to the transmitter 32 should be such as to both disable the power generating function of the transmitter 32 and its connection with the common antenna whenever either a transmit inhibit signal is present or the control means 58 is in a receive mode condition, so that the receiver 34 will then be in enabled operating condition and also coupled with the common antenna for receiving incoming signals therefrom. The other input connection 43 to the transmitter 32 represents the injection of radio frequency excitation for the transmitter 32 at the frequency at which same is supplied in the manner hereinafter described by the frequency controlling portions of the apparatus. The other two input connections 45 and 47 to the receiver 34 represent respectively what is equivalent to a local oscillator injection signal for the receiver 34 and a tuning voltage for controlling the tuning of varactor, voltage controlled, tuned circuits in the receiver 34. The output connection 49 from the receiver 34 represents an audio output to a loud speaker, headphones or other utilization device.

It will be understood that, since the transmitter 32 operates at the particular frequency of the excitation input applied to it via the connection 43, while the receiver 34 utilizes the "external local oscillator" input supplied to it via the connection 45 in an internal manner conventional for superheterodyne receiver operation, the frequency of the signals input to the transmitter 32 and the receiver 34 via connections 43 and 45 respectively will differ from each other during transmitting and receiving on the same selected frequency channel. Accordingly, it is next noted that the transmit enable signal on output line 33 of the T-R switch 30 is delivered not only to the transmitter 32, but also via a connection 51 as an input to a side step oscillator block 36, which also receives as an alternate input via connection 53 the receiver enable signal from the output 35 of the T-R switch 30 when it is being produced by the latter. The one of the input connections 51 and 53 of the side step oscillator 36 to which an enabling signal is at the time being applied will, therefore, determine the frequency of the output of the oscillator block 36 represented by the connection 55, with the frequency of such output being different depending upon whether the T-R switch 30 is calling for transmit mode or receive mode type operation of the apparatus.

A reference oscillator (and divider) block 38, which is preferably crystal controlled, provides an output signal of constant, predetermined frequency, which is delivered via the connection 57 as the reference frequency input to a frequency and phase comparator block 40. The comparator block 40 delivers via the output connection 59 thereof a demodulator output in the nature of a direct current electrical potential of variable level corresponding to the direction and extent to which the frequency of a second input signal applied to the comparator 40 via an input connection 61 varies in frequency or phase from the reference signal being applied to the comparator 40 via its input connection 57 from the reference oscillator 38. The manner in which the signal applied to the comparator 40 via its input connection 61 is produced will be further explained shortly, but it is next convenient to consider the manner in which the varying level voltage output from the comparator 40 via its output connection 59 is utilized.

It may first be observed that the varying level potential output on connection 59 from the comparator 40 is coupled as at 63 with the input connection 47 to the receiver 34, so that it will be clear that it is such varying level voltage signal that is employed for accomplishing the previously mentioned control over the tuning varactors utilized in the preferred form of receiver 34. Such varying level voltage output from the comparator 40 is also directly coupled via the connection 59 with a voltage controlled oscillator 42 and determines the frequency of the output of the latter, which is connected as at 65 with a buffer amplifier 44 and also via a connection 67 with a filter amplifier 56. The filter amplifier 56 also utilizes voltage controlled, varactor components for tuning, and, for that purpose, it will be noted that the variable level potential output from the comparator 40 is also applied via the connection 63 and a connection 69 as an input to the filter amplifier 56. Thus, it will be seen that the filter amplifier 56, which is appropriately tuned in response to the level of voltage applied to its input connection 69, filters and amplifies the signal output from the voltage controlled oscillator 42 received via the connections 65 and 67 and produces as outputs upon connections 43 and 45 respectively the aforementioned excitation signal for the transmitter 32 and the local oscillator input for the receiver 34.

The output at connection 65 of the voltage controlled oscillator 42 is also passed through and amplified by the buffer 44 and applied via a connection 71 as a second input to a side step mixer block 46, which is also receiving as an input via the connection 55 the signal generated by the side step oscillator block 36, which will be of frequency appropriate for either transmit mode or receive mode type operations. The side step mixer 46 generates at its output connection 73 a resultant signal of frequency depending upon the relationship between the frequencies of the input signals applied to the mixer 46 via the connections 55 and 71, and such resultant signal output from the mixer 46 is applied as the primary input to a programmable, frequency divider, counter block 48, it being noted that the output signal of the frequency divider 48 is delivered via the connection 61 to the comparator 40 as the frequency significant input to the latter that is compared therein with the reference frequency signal from the oscillator 38. The frequency divider 48 operates to produce an output signal at its connection 61 to the comparator 40, which is of frequency equal to the frequency of the signal applied at its input connection 73 divided by an integer determined by the particular combination of control signals that are present (or absent) upon a plurality of control input connections 75 to the frequency divider 48.

At this point, it should be observed that the signal path from the output connection 59 of the comparator 40 to the voltage controlled oscillator 42 (as a voltage level), thence via connection 65, buffer 44, connection 71, mixer 46 and connection 73 to the frequency divider 48 (as a frequency significant signal), and thence via connection 61 back to the comparator 40 (as a frequency significant signal), where comparison of the last mentioned signal is made with the frequency and phase of the reference signal supplied to input connection 57 of the comparator 40, represents a frequency and phase locked, feedback loop by which the frequency of the output signal delivered by the oscillator 42 to the filter amplifier 56, and thence (after modification in the latter subsequently described) to the transmitter 32 and the receiver 34, is continuously maintained in accordance with the frequency selection control signals applied to the frequency divider 48 via the connections 75. Those skilled in the art will already have appreciated that the wide range of frequency selections to be provided require the use of a variable oscillator (as at 42), and will now recognize the advantages provided by the mentioned "loop" for assuring the needed frequency stability, especially where the application involves very high frequencies.

Before turning attention from the comparator 40, it should be noted that, in addition to the voltage level signal provided at its output connection 59, it also is adapted to provide a logic type signal voltage for indicating the occurrence of any loss of frequency and phase locked operating status by the comparator 40, in the event that should occur due to some abnormal circumstance; such logic signal is presented at output connection 77 of the comparator 40, and its utilization will be subsequently explained.

The control signals applied to the plurality of input connections 75 of the frequency divider 48 are derived from a digital frequency selection switch block 50, which may be of various constructions but primarily involves a plurality of electrical switches that may be manually controlled by a user in some appropriately calibrated or encoded fashion to apply or withhold a control voltage from each of the control connections 75 in manner that will be treated by the divider 48 as representing a selection of a divisor to be used by the divider 48 in dividing the frequency of the signal on input connection 73. The way in which this accomplishes frequency selection for controlling the operation of the transmitter 32 and receiver 34 will be subsequently further discussed in greater detail. For the moment, however, it should suffice to observe that various subsets of the plurality of connections 75 correspond to particular digits of a frequency selection expressed in terms of some number base, such as in decimal notation, but serve to encode such digits in a form, such as binary coded decimal notation, that will be treated by the divider 48 as specifying the divisor by which it is to divide the frequency of the signal applied to its input connection 73.

At least certain of the encoded control signals applied to the connections 75 are also extended from the digital frequency selection switch block 50 as connections 79 to an out of band detection logic module 52, which provides logic gates and interconnections therebetween appropriate for detecting whenever particular digits of the frequency selected with the selection switch block 50 either are greater or less than the permitted values for such digits when the selected frequency is authorized for transmission as well as reception. Upon detection of selection of an out of band frequency (i.e., one outside the authorized frequency range for transmission), the detection module 52 produces a logic type signal so indicating at its output connection 81. Any out of band indicating signal on the connection 81 and any loss of frequency and phase lock indicating signal on the connection 77 are fed to a combining logic block 54, which operates in response to either of same to produce the previously mentioned transmit inhibit signal at the output connection(s) 37 and 39. The urgent need for protection against inadvertent transmission on a navigation signal frequency, for example, may be appreciated from consideration of the possibly devastating consequences to other aircraft relying upon clear reception of navigation signals that might otherwise be rendered unintelligible.

Consideration at this early stage of the explanation of the invention of certain exemplary frequency parameters and relationships involved in apparatus embodying the invention should be helpful in understanding the reasons why particular blocks are preferably implemented in the manner hereinafter to be more fully described, and such a frequency-oriented illustration will next be given with reference to the NAV/COM transceiver apparatus chosen as a basis for describing a preferred embodiment of the invention. It will be recalled that the overall band of frequencies to be handled extends from 108.000 MHz through 135.975 MHz, with the individual signal channels being spaced at intervals of 0.025 MHz (25 KHz) within the portion of the band used for communications and at intervals of 0.050 MHz (50 KHz) within the portion of the band used for navigation signals, with all channels throughout the band being available for reception, but with only those channels between 118.000 MHz and 135.975 MHz being available for transmission. It is first observed that, since the transmitter 32 receives its radio frequency excitation from the filter amplifier 56 via the connection 43, the filter amplifier 56 must be tunable by the voltage level applied to its input connection 69 for providing at its output connection 43 an excitation signal variable between 118.000 MHz and 135.975 MHz to the transmitter 32 when the apparatus is operating in a transmit mode. The receiver 34, however, must be capable of tuning over a wider range of reception channels extending from 108.000 MHz through 135.975 MHz. Moreover, since the receiver 34 is of the superheterodyne type having mixer or frequency conversion circuitry for translating the frequency of incoming radio signals down to a suitable intermediate frequency for purposes of internal amplification and selectivity, it may be anticipated that the frequency of the "local oscillator" signal to be supplied by the filter amplifier 56 to the receiver 34 via the connection 45 will be offset from the actual frequency of the channel selected for reception by the amount dictated by the intermediate frequency implemented within the receiver 34. In the illustrative preferred embodiment, the receiver 34 utilizes a "first" intermediate frequency (it may have more than one, if it is of the double conversion superheterodyne type, as is desirable) of 10.700 MHz, so that the filter amplifier 56 must be tunable by the voltage level applied thereto via connection 69 for providing via its output connection 45 a "local oscillator" signal that is variable between 118.700 MHz and 146.675 MHz. It may be observed in passing that the latter circumstance accounts for the need to optimize interstage coupling within the filter amplifier 56 throughout an unusually broad band of frequencies extending from a little over 115.000 MHz up to a little under 150.000 MHz, the solution to that problem being subsequently described in greater detail.

Since the filter amplifier 56 derives its frequency significant input from the voltage controlled oscillator 42 via the connections 65 and 67, it might be expected that the oscillator 42 would merely operate within the same ranges as just mentioned as being required for the outputs of the filter amplifier 56 to the transmitter 32 and the receiver 34. However, it has been found advantageous both in connection with the construction and operation (especially the tuning) of the voltage controlled oscillator 42 and in order to permit the employment in the reference oscillator 38, the comparator 40 and the frequency divider 48 of integrated circuit components having low power drain characteristics, such as those utilizing CMOS technology which operate most efficiently at relatively lower frequencies, to arrange for the voltage controlled oscillator 42 to operate and be tunable through frequency ranges approximately an order of magnitude lower than the frequencies of the outputs required from the filter amplifier 56. Accordingly, the filter amplifier 56 is arranged to provide its outputs based upon the tenth harmonic of the frequency of the input thereto from the voltage controlled oscillator 42, and the latter is arranged to be tuned by the voltage level applied thereto via the connection 59 from the comparator 40 through a range of frequencies from 11.800 MHz through 13.5975 MHz for transmit mode operation and through a range of 11.870 MHz through 14.675 MHz for receive mode operation.

The output signal from the voltage controlled oscillator 42, which will be within one of the last mentioned ranges depending upon whether the apparatus is in a transmit or receive mode of operation, is also delivered via the connection 65, the buffer 44 and the connection 71 to the side step mixer 46 as one of the frequency significant inputs to the latter, the other being the signal input to the side step mixer 46 via the connection 55 from the side step oscillator 36. The side step oscillator 36 is adapted to deliver to the side step mixer 46 a signal of either of two frequencies depending upon whether the apparatus is in transmit mode with a transmit enable signal upon the connection 51 or is in receive mode with a receive enable signal on the connection 53; when in transmit mode, the side step oscillator 36 delivers to the connection 55 and the side step mixer 46 a signal having a constant frequency of 10.000 MHz, but when the apparatus is in receive mode the signal thus delivered from the oscillator 36 to the mixer 46 is of a constant frequency of 11.070 MHz. Accordingly, it will be apparent that the output from the side step mixer 46 to the frequency divider 48 via the connection 73 will range from 1.800 MHz through 3.5975 MHz for transmit mode and from 0.800 MHz through 3.5975 MHz for receive mode.

For reasons of accuracy and stability, the frequency chosen as the one at which frequency and phase comparisons and synchronizations are to be accomplished by the comparator 40 should be relatively low, and the frequency chosen for that purpose in the preferred embodiment is 0.0025 MHz (2.5 KHz). Accordingly, the output of the reference oscillator 38 to the comparator 40 via the connection 57 is also 0.0025 MHz, which is conveniently generated by the reference oscillator 38 by dividing the output from crystal-controlled oscillations at 10.240 MHz by 4,096.

As should be expected, the input signal to the comparator 40 from the frequency divider 48 via the connection 61 will also need to be at very close to the same frequency as the reference input to the comparator 40 from the reference oscillator 38, in order for the comparator 40 to maintain satisfactory frequency and phase lock or synchronization and to provide a proper voltage level at its output connection 59 for use in tuning voltage controlled components in each of the voltage controlled oscillator 42, the filter amplifier 56 and the receiver 34. To illustrate how the frequency of the signal delivered to the frequency divider 48 via the connection 73 from the side step mixer 46, which will differ for various selected frequencies of operation as well as being dependent upon whether the apparatus is in transmit mode or receive mode, is appropriately "translated" by the frequency divider 48 into an output to its connection 61 to the comparator 40 of the required frequency at or very near 0.0025 MHz (2.5 KHz), it will be necessary to consider specific examples.

Assume that an operating frequency of 118.000 MHz has been selected and that the apparatus is in receive mode. The connections 75 from the digital frequency selection switches 50 to the frequency divider 48 are such that, when an operating frequency of 118.000 MHz has been selected, the frequency divider 48 will be caused to divide the frequency of any signal applied to its input via the connection 73 from the side step mixer 46 by a factor of 720. In receive mode, the input to the side step mixer 46 from the side step oscillator 36 via the connection 55 will always be at a frequency of 11.070 MHz. With an operating frequency of 118.000 MHz selected, as soon as frequency and phase lock are achieved by the comparator 40 (which is almost immediate under normal conditions), the voltage level delivered from the comparator 40 to the voltage controlled oscillator 42 via the connection 59 will tune the oscillator 42 to output a signal having a frequency of 12.870 MHz at its output connection 65, which is passed through the buffer 44 and the connection 71 to the side step mixer 46. By heterodyning the 11.070 MHz signal from the side step oscillator 36 with the 12.870 MHz signal from the voltage controlled oscillator 42 and buffer 44, the side step mixer 46 delivers to the frequency divider 48 via the connection 73 a signal having a frequency of 1.800 MHz. The frequency of the last mentioned 1.800 MHz signal is then divided by 720 by the frequency divider 48 to produce a signal at the output connection 61 of the latter having the required frequency of 0.0025 MHz (2.5 KHz), or very close thereto, for comparison by the comparator 40 with the reference frequency signal from the reference oscillator 38. Assuming the same operating frequency of 118.000 MHz is selected, but that the transmit mode of the apparatus is invoked, the input to the side step mixer 46 from the side step oscillator will then be at 10.000 MHz, the voltage controlled oscillator 42 will provide an output signal of 11.800 MHz, the side step mixer 46 will again output a signal of approximately 1.800 MHz, and the division of the latter by 720 within the frequency divider 48 will provide the desired output signal to the comparator 40 of a frequency at or near 0.0025 MHz (2.5 KHz). Those skilled in the art will understand that the frequency and phase synchronizing function of the comparator 40 operates in a fashion such that, to any extent the frequency of the signal applied to the comparator 40 via the connection 61 (or its phase, if less than a full cycle of difference is involved) may exceed the frequency of the reference signal from the oscillator 38, the comparator 40 will appropriately adjust the level of the voltage at its output connection 59 (increasing it in the preferred embodiment) to tune the voltage controlled component of the voltage controlled oscillator 42 to influence the frequency of the output from the side step mixer 46 in the direction required to move toward and accomplish an exact frequency and phase lock with the frequency and phase of the reference signal from the reference oscillator 38, and vice versa for a case in which the frequency of the input at connection 61 may be slightly less than that of the reference signal from the oscillator 38.

Further examples to clarify the generic nature of the involved frequency relationships would be to assume that the digital frequency selection switches 50 have been set to select an operating frequency of 119.000 MHz (which is offset by 1.000 MHz or 40 channels mutually displaced at intervals of 0.025 MHz from the previously considered selection of 118.000 MHz). The frequency divider 48 will then effectively divide the frequency of any signal applied to its input connection 73 by a factor of 760 (instead of by a factor of 720, as was the case for a selected operating frequency of 118.000 MHz). Further assume, first, that the apparatus is in receive mode, whereupon the signal from the side step oscillator 36 will still be at 11.070 MHz, but the output signal from the voltage controlled oscillator will now be tuned to 12.970 MHz, which provides an output from the side step mixer 46 at 1.900 MHz, which, when divided by 760 within the frequency divider 48, again provides the required signal of approximately 0.0025 MHz (2.5 KHz) to the comparator 40 via the connection 61. Similarly, assuming transmit mode at an operating frequency of 119.000 MHz, the output of the side step oscillator 36 is still at 10.000 MHz, but the voltage controlled oscillator 42 is tuned to provide an output at 11.900 MHz, which again produces an output from the side step mixer 46 at 1.900 MHz when exact synchronization is occurring, and such 1.900 MHz signal produces an output of 0.0025 MHz (2.5 KHz) at the output connection 61 of the frequency divider 48 after the frequency of the input signal has been divided by 760 by the frequency divider 48.

Figure 4:
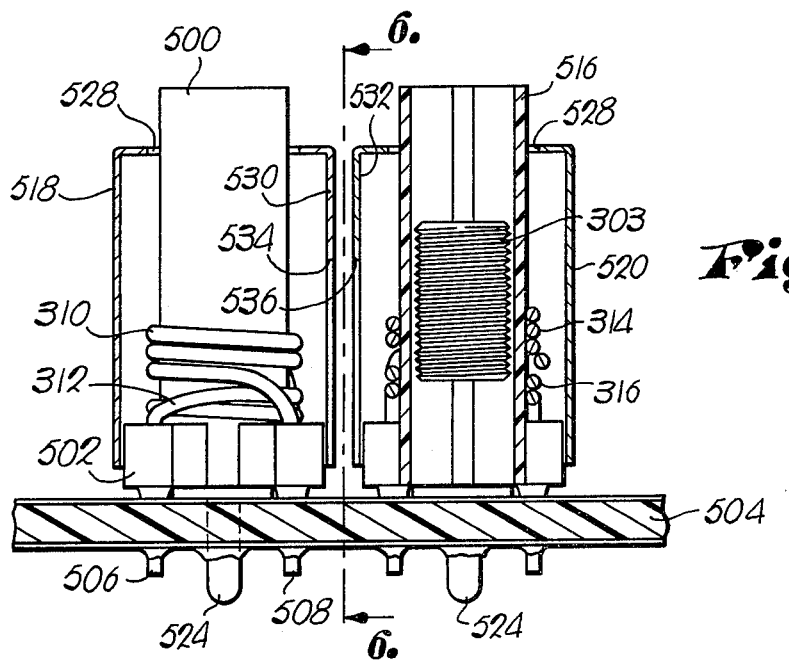
FIG. 4 is a fragmentary view, partially in elevation and partially in vertical cross-section taken through the structure illustrated in FIG. 3.
Figure 5:
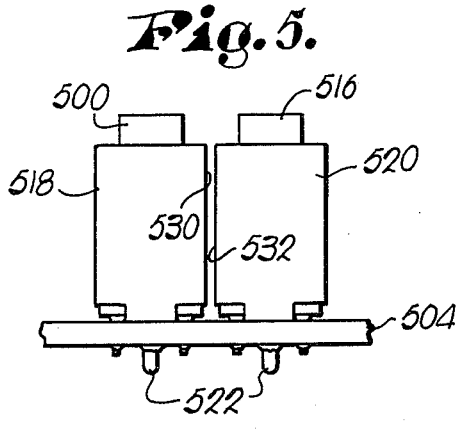
FIG. 5 is a fragmentary, elevational view, on a reduced scale, of the structure shown in FIG. 3.
Figure 6:
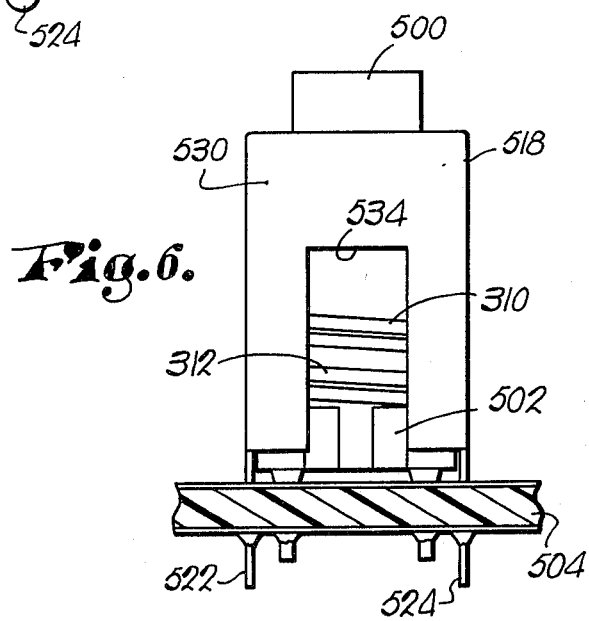
FIG. 6 is a fragmentary view, partially in cross-section and partially in elevation, taken from line 6—6 in FIG. 4.

The foregoing overview should facilitate understanding of the more detailed descriptions that follow, as well as better appreciation of the significance of various advantageous features of the improved construction shown in greater detail in FIGS. 2 through 6.

Frequency Selection—Switching and Comparison with Reference

Referring to FIG. 2-a, the nature of and interconnections between the digital frequency selection switch block 50, the programable frequency divider counter block 48, the reference oscillator block 38 and the frequency and phase comparator block 40 are further illustrated, along with connection paths leading to and from the same to other blocks necessarily shown on other sheets of the composite FIG. 2.

The terminals 60 and 62, to which the power leads 161 and 163 are respectively coupled (and will be understood to extend throughout the several sheets of composite FIG. 2), are adapted to have any suitable source of direct current operating power connected therewith, a rechargable 12.6 volt battery module being used in the preferred embodiment for portability and to provide independence from reliance upon the electrical system of an aircraft or from any need for an electrical system in a glider or balloon. The terminal 62 will preferably be coupled with a common "circuit ground," as indicated at 64. The positive lead 161 will preferably be bypassed to the grounded lead 163 by one or more suitable capacitances represented as at 66.

The digital frequency selection switches 50 are shown in FIG. 2-a as a plurality of individual, manually operable, single pole, single throw, electrical switches labelled A through L inclusive, each interposed in series between a positive lead 165 and a corresponding terminal 9-10, 15-22, and 4-3 inclusive of the frequency divider 48 via respective leads 167A-L inclusive. In the NAV/COM transceiver apparatus chosen for illustration, it will be understood that the switches 50A and 50B permit a binary encoding of a decimal digit from 0 through 3 utilized to represent a multiplier for the digit of a frequency representing tens of MHz; the switches 50C-50F inclusive permit binary encoding of a decimal digit from 0 through 9 representing a multiplier for the one MHz digit of a frequency; switches 50G-50J inclusive permit binary encoding of the digit of a frequency representing hundreds of KHz; and the switches 50K and 50L permit binary encoding of a multiplier for the digits of a frequency representing increments of 25 KHz. The frequency relationships in the preferred embodiment imply that any frequency available for selection will be at least 100 MHz, but less than 200 MHz, which is adequate to cover the frequency range of interest in a NAV/COM transceiver, so that no switching need be provided with respect to the digit of the frequency representing a multiplier of 100 MHz (which is impliedly maintained constant at 1). It should be understood, however, that although the switches 50 are depicted as individual switch components for the sake of simplicity of illustration, they may be implemented with the use of switch assemblies having a plurality of banks each having a plurality of contacts and with each such switch assembly providing through a respective control knob and indicator a selection for the value of the corresponding digit of the overall frequency being selected. A plurality of resistances 68 are respectively coupled between each of the leads 75A-75L inclusive and the ground lead 163.

The programmable frequency divider 48 is preferably implemented with a single integrated circuit chip utilizing low power drain technology, such as CMOS, a desirable component for such purpose being the type CD4059AD Programable Divide-By-N Counter available on the market from Radio Corporation of America. The significant terminals of the preferred RCA component for implementing the divider 48 are numbered in FIG. 2-a with the pin numbers associated with that component in the technical literature relating thereto, except that the positive operating power terminals (typically pins 11, 13 and 24) ar labelled "V" and depicted as connected to the positive lead 161 by a lead 169, while the terminals of such component to be grounded (typically 2, 5-8, 12 and 14) are labelled "G" in the block representing the divider chip 48 and are depicted as connected with the ground lead 163 by a lead 171. It will be recognized that the leads 75A-75L from the switches 50A-50L and the connections thereof with the terminals 9-10, 15-22 and 4-3 of the divider chip 48 correspond directly to the connections illustrated in FIG. 1 and identified by the reference numeral 75. Similarly the input connection 73 to the frequency divider 48, as shown and thus designated in FIG. 1, will be seen to enter FIG. 2-a from the right edge thereof and to interconnect with pin or terminal 1 of the divider chip 48. Lastly, the pin or terminal 23 of the divider chip 48 represents the divided frequency output of the divider 48 and is coupled with the frequency and phase comparator 40 via a lead or connection shown and designated as 61 in both FIGS. 1 and 2-*a*. In FIG. 2-*a* the connections from the selector switches 50 to the out of band detection logic block 52 designated 79 in FIG. 1 are further detailed in FIG. 2-*a* as leads 79A, 79B, 79C, 79D and 79E respectively connected with the leads 75A, 75B, 75C, 75D and 75E in FIG. 2-*a* and extend from the right hand edge of that figure toward a subsequent sheet of the composite FIG. 2 upon which the out of band detection logic block 52 is illustrated. It will be noted that there are leads 79 associated only with those of the switches 50 having encoding significance in connection with the digits of a selected frequency representing tens of MHz (switches 50A and 50B and leads 79A and 79B) and units of MHz (switches 50C, 50D and 50E and leads 79C, 79D and 79E), and that the latter group cover only the bits of a BCD encoding representing contributing values of 8, 4 and 2; the reason for this may be clear upon recalling that the out of band detection needed in the illustrative NAV/COM transceiver embodiment involves detection of frequency selections below 118.000 MHz and above 135.975 MHz, although the matter will be further discussed in connection with the detector block 52.

The reference oscillator block 38 is primarily implemented in the preferred embodiment with a low power drain integrated circuit chip, such as the type CD4060A Binary Divider and Oscillator marketed by Radio Corporation of America, which is illustrated in block form in FIG. 2-*a* with the pin numbers of the more relevant terminals thereof shown, the terminal to be supplied with operating power (16) being labeled "V" and connected to the positive lead 161 by a lead 173, and the terminals thereof to be grounded (8 and 12) being labelled "G" and connected to the ground lead 163 by a lead 175. A frequency controlling piezoelectric crystal 70, having a resonance of 10.240 MHz, is coupled between the terminals 10 and 11 of the chip 38 and conventionally has a shunt resistance 72 and oppositely grounded capacitances 74, 76 and 78 coupled therewith as shown. Although the internal oscillator of the chip 38 oscillates at 10.240 MHz under control of the crystal 70, the chip 38 internally then divides such 10.240 MHz signal by a selected appropriate number (4,096 in the preferred embodiment) to present at the output terminal 1 of the chip 38 a stable signal of the desired frequency (2.5 KHz in the preferred embodiment), which is fed to the comparator 40 via the connection designated 57 in both FIG. 1 and FIG. 2-*a*.

The comparator block 40 is similarly implemented with a low power drain integrated circuit chip, preferably the type CD4046A Phase Locked Loop component marketed by Radio Corporation of America. Again the terminal of the chip 40 to be supplied with operating power (16) is labelled "V" and connected to the power lead 161 by a lead 177, the terminals to be grounded (5 and 8) are labelled "G" and connected to ground lead 163 by a lead 179, and the more relevant terminals of the chip 40 are designated by their pin numbers in the block representing the chip 40. It is necessary to filter from the variable voltage output from terminal 10 of the comparator 40 the radio frequency components that would otherwise be present therein, in order that such output can be best suited for performing its tuning functions within the voltage controlled oscillator 42, the filter amplifier 56 and the receiver 34. The high impedance characteristics of such output from the preferred form of chip 40 permits avoidance of the disadvantages of having to utilize inductance-capacitance type filtering for this purpose, and it has been found that resistance-capacitance, low pass filtering is quite adequate. A portion of the resistance-capacitance filtering employed is associated with the connection 59, but is shown and will be described in conjunction with the input circuitry of the portions of the apparatus at which the variable voltage signal is applied. The remaining portion of such resistance-capacitance filtering, which is associated with the "ground side" and illustrated in FIG. 2-*a*, includes a resistance 80 coupled between terminals 13 and 9 of the comparator chip 40, a resistance 82 and a capacitance 84 coupled in series between the terminal 9 and the ground terminal "G" of the chip 40, and a capacitance 86 coupled in shunt with the series resistance 82 and capacitance 84 between the terminal 9 and the terminal "G" of the chip 40. As will be clear from FIGS. 1 and 2-*a*, the 2.5 KHz reference signal from terminal 1 of the reference oscillator 38 is fed to terminal 14 of the comparator 40 via connecting lead 57, the synchronization loop signal of at or near 2.5 KHz from terminal 23 of the frequency divider 48 is fed to terminal 3 of the comparator 40 via connecting lead 61, the variable level tuning voltage produced by the comparator 40 and presented at terminal 10 thereof is fed to connecting lead 59 (which extends from the right edge of FIG. 2-*a* toward the other sheets of the composite FIG. 2 upon which the voltage controlled oscillator 42, the filter amplifier 56 and the receiver 34 are shown), and the "out of lock" signal produced under appropriate conditions by the comparator 40 and presented at terminal 1 thereof is fed to connecting lead 77 (which extends from the right edge of FIG. 2-*a* toward another sheet of the composite FIG. 2 upon which the combining logic 54 is shown).

Frequency Selection—The locking Signal Loop

In continuing to consider the frequency selection portions of the apparatus, it is logical to next turn attention to further details of the voltage controlled oscillator 42, the buffer 44 and the side step mixer 46, which are disposed within the locking loop between output terminal 10 of the comparator 40 and the input terminal 1 of the frequency divider 48, as well as the side step oscillator 36 from which the mixer 46 derives one of its inputs. For such purpose, reference is necessarily made to FIG. 2-*c*, wherein such portions of the apparatus are shown, it being noted that the connections 59 and 73 between FIGS. 2-*a* and 2-*c* merely extend across FIG. 2-*b* without couplings to any components on the latter, and that the relevant connections 51, 53 and 69 between FIGS. 2-*c* and 2-*d* appear at the right edge of the former and the left edge of the latter.

As previously mentioned, resistance-capacitance filtering is employed with the comparator 40 for the purpose of eliminating radio frequency components in the variable level, direct current, output signal it provides via its terminal 10 to the output connection 59, and a part of such filtering circuitry has already been described. The remainder of the subject filtering circuitry is shown in FIG. 2-*c* adjacent to lower left corner of the latter and involves a resistance-capacitance network including resistances 88, 90 and 92 successively coupled in series with the connecting lead 59, a resistance 94 coupled from the lead 59 to the ground lead 163, a series resistance 96 and capacitance 98 coupled from the interconnection of resistances 88 and 90 to the ground lead 163, and a capacitance 100 coupled from the interconnection of resistances 90 and 92 to the ground lead 163. Thus, the variable level voltage from terminal 10 of the comparator 40, after filtering to remove radio frequency components, is made available upon a lead 181 for use in tuning the voltage controlled oscillator 42 in the manner next to be described. Before turning attention from the mentioned filtering network, however, it should be noted that the variable level voltage used for tuning the filter amplifier 56 and the receiver 34 is also derived from the connecting lead 59 via such network by the connecting lead 69, which is connected to the interconnection between the resistance 96 and the capacitance 98 and extends from the right edge of FIG. 2-c toward FIG. 2-d where it is coupled with the filter amplifier 56 and also with the connection 47 leading to the receiver 34.

The voltage controlled oscillator 42 includes a transistor 102 conventionally having collector resistors 104 and 106, an emitter resistor 108, base biasing resistors 110 and 112, and a bypass capacitance 114 connected in the usual fashion shown. A special arrangement is utilized for the frequency controlling tank circuit associated with the base of the transistor 102, however, which includes an inductance 116 having one end thereof coupled through a resistance 118 to the ground lead 163, an intermediate tap 120 thereof coupled through a direct current blocking coupling capacitance 122 to the base of the transistor 102, and the opposite end thereof coupled with one end terminal of a varactor diode 124 of which the opposite end terminal is coupled with ground lead 163 and the control terminal is coupled with the tuning voltage lead 181, along with the capacitances 126 and 128 that are coupled in series between the base of the transistor 102 and the ground lead 163 and have their interconnection coupled with the emitter of the transistor 102 by a lead 183. From the standpoint of determining the frequency of oscillation of the oscillator 42 employing the mentioned type of tank circuit, the dominant fixed element will be the inductance 116 and the dominant variable element will be the reactance of the varactor diode 124. The amount of variation in the level of the tuning voltage produced at terminal 10 of the comparator 40 and delivered to the control terminal of the varactor diode 124 via the lead 181 will during typical operation range only between a low of about 1.0 volt and a high of about 7.0 volts (although a wider swing from near ground potential to near the supply potential could occur during certain conditions before locking has been achieved, which typically occurs after about three cycles). Accordingly, the range of change in the reactance of the varactor 124 that may be achieved with the available, variable level tuning voltage is subject to definite limitations that would initially appear inadequate for the level of frequencies and relatively wide range of frequencies over which the oscillator 42 must be tuned for applications such as that involved in the preferred embodiment being described for illustration. Accordingly, it will be perceived that, instead of a more conventional type of arrangement in which the varactor 124 would be employed to tune the inductance 116 to parallel resonance, the tank circuit is so arranged that the varactor 124 is in series with the inductance 116 and is utilized to tune the latter to a series resonant condition. The varactor 124 employed in the preferred embodiment is of type MV104, which is available on the market from various suppliers, and the value of the inductance 116 and other associated components are so chosen that the desired range of oscillating frequencies for the oscillator 42 will be provided. In a specific implementation of the preferred embodiment, such component values are so selected that a tuning voltage of 1.0 volt at the tuning lead 181 will cause the oscillator 42 to oscillate at a frequency of approximately 11.870 MHz, while a tuning voltage of 7.0 volts will cause oscillation at a frequency of approximately 14.660 MHz. It should be noted, in passing, that the employment of the mentioned series resonant tuning in the voltage controlled oscillator 42 is also significant in permitting the use of a tuning voltage of the same potential derived via the connecting lead 69 to track with the tuning of parallel resonant tank circuits utilizing similar varactor components in the filter amplifier 56 and the receiver 34, wherein parallel resonance is employed and the frequency at which such latter tank circuits are being tuned to resonance is ten times the frequency to which the voltage controlled oscillator 42 is being concurrently tuned by the same level of tuning control voltage. It should also be observed that, although the transistor 102 and the other transistors hereinafter described could be of various available kinds, the preferred embodiment employs type MPSH10 radio frequency transistors available on the market from various suppliers for each of the transistor components hereinafter referred to, except as specifically otherwise indicated.

The output of the voltage controlled oscillator 42 presented at the collector of the transistor 102 is utilized in two ways. First, it is passed through the coupling capacitance 130 to the connecting lead 67 running to the filter amplifier 56 shown in FIG. 2-d, for which it provides the frequency significant input. Secondly, it is passed through the coupling capacitance 132 as the input signal to the base of a transistor 134 of the buffer amplifier 44. Since the buffer amplifier 44 serves merely to amplify the output signal from the oscillator 42 without modifying its frequency characteristics and to isolate or buffer the oscillator 42 from the side step mixer 46, and since the circuitry for the amplifier 44 will be perceived from FIG. 2-c to be conventional, it would appear unnecessary to further describe such circuitry. Similarly, it is noted that resistance 136 between the positive lead 161 and a local supply lead 185 merely illustrates that the operating potential supplied to the oscillator 42, buffer 44 and mixer 46 may be thus set at a desired level, while the capacitances 138 and 140 illustrate that conventional techniques for bypassing operating supply leads to ground may be employed.

The side step oscillator 36 is shown in the upper left portion of FIG. 2-c, and will be seen to include a radio frequency transistor 146 and a pair of switching transistors 148 and 150 (for the latter of which the illustrative preferred embodiment employs type 2N3415 transistor components available on the market from various suppliers). The transistors 148 and 150 are utilized as electronic switches respectively responsive to a receive enable signal on the connecting lead 53 or a transmit enable signal on the connecting lead 51 to effectively couple either a receive mode piezoelectric crystal 152 or a transmit mode piezoelectric crystal 154 into the base to ground circuit of the transistor 146 for controlling the frequency at which the oscillator 36 will oscillate (11.070 MHz for receive mode and 10.000 MHz for transmit mode). More specifically, the emitters of both of the transistors 148 and 150 are coupled to the ground lead 163 through the ground extension lead 187, the collector of the transistor 148 is coupled through coupling and trimming capacitances 156 and 158 with one terminal of the crystal 152 whose other terminal is connected with the base of the transistor 146, the collector of the transistor 150 is similarly coupled through coupling and trimming capacitances 160 and 162 with one terminal of the crystal 154 whose other terminal is connected with the base of the transistor 146, the receive enable signal lead 53 from the transmit-receive switch 30 is coupled through a resistance 164 with the base of the transistor 148, and the transmit enable signal lead 51 from the transmit-receive switch 30 is similarly coupled through a resistance 166 with the base of the transistor 150. Whichever of the transistors 148 and 150 is receiving the corresponding enable signal at its base will conduct and couple its associated crystal 152 or 154 into the frequency controlling base circuit of the transistor 146, while the other of the transistors 148 and 150 will be in a non-conductive state effectively removing the associated crystal 152 or 154 from the base circuit of the transistor 146. The circuitry of the side step oscillator 36 is otherwise conventional and includes a collector load resistance 168, an emitter resistance 170, biasing resistances 172 and 174, oscillation sustaining capacitances 176 and 178 whose interconnection is coupled to the emitter of the transistor 146, and an output coupling capacitance 180 through which the output signal of the oscillator 36 is coupled from the emitter of the transistor 146 to the connecting lead 55 running to the base of transistor 144 of the side step mixer 46.

Returning attention to the mixer 46, therefore, it will be understood that the two signals to be mixed to produce a heterodyne derived output are being applied to the base of the transistor 144 and are the amplified signal from the voltage controlled oscillator 42 and the signal from the side step oscillator 36. A collector load resistance 182 and a collector to base resistance 184 are conventionally provided for the mixer transistor 144. The mixer output signal is taken from the collector of the transistor 144 through a filtering network including a series resistance 186, grounded capacitances 188 and 190, and a coupling capacitance 192, from the latter of which it is fed via the connecting lead 73 back to input terminal 1 of the frequency divider 48 (see: FIG. 2-a), to complete the frequency and phase locked, synchronizing loop of the digital frequency synthesizer portion of the apparatus previously identified.

Frequency Selection—Out of Lock or Out of Band Detection

In any radio transmitting equipment in which the frequency of transmissions will be dependent upon the synchronized operation of a frequency and/or phase locked loop of a digital frequency synthesizer (or otherwise), it is highly desirable in order to avoid violation of transmitting authorizations or even more serious possible consequences of transmitting upon an unauthorized frequency that some suitable means be provided for inhibiting the operation of the transmitter in the event that a synchronized or locked condition should either not be achieved upon start-up or should be thereafter interrupted. It is at least equally as vital in radio equipment including a capacity for transmission which employs digital frequency synthesizer techniques for selection of the operating frequency that suitable means be provided for detecting possible selection of a frequency upon which transmission is not authorized. The latter problem is particularly acute in radio transceivers, such as the one chosen as a basis for herein illustrating a preferred embodiment of the invention, in which the range of frequency selection to be provided by the digital frequency synthesizer is wider than some particular portion thereof within which transmission is authorized, in order to also provide reception capability throughout the entire range of the wider band. Actually, whenever digital frequency synthesizer techniques are employed in selecting the frequency upon which a radio transmitter will be activated, unless the range of authorized transmitting frequencies happens to coincide exactly with the frequency selection choices provided by the inherently digital range provided by the frequency synthesizer (which would be a rare coincidence), the problem of avoiding possible "out of band" transmission through inadvertently erroneous settings of the frequency selection controls of the digital synthesizer is a significant one.

The present invention solves these problems by providing simple, reliable and versatile means for detecting either an out of lock condition or an out of band condition and for providing therefrom a control signal that may be utilized for inhibiting transmission in the event either of such conditions occurs. The details of the implementation of such protective means, as applied to the preferred form of NAV/COM transceiver being described for illustration, are shown primarily in FIG. 2-b, to which reference is now made, in conjunction with FIG. 1.

The components utilized for the mentioned protective purposes will first be identified and the manner of interconnecting the same to achieve the desired protection in the context of the preferred embodiment will then be described. A plurality of inverters generally designated 194 and further respectively labelled "M", "N", "P", "Q" and "R" may be conveniently implemented from those available on an integrated circuit chip such as the type CD4069B Hex Inverter assemblies available on the market from Radio Corporation of America. A first group of three-input AND gates generally designated 196 and including gates respectively further labelled "S" and "U", as well as a second group of similar AND gates generally designated 198 and including gates respectively labelled "X", "Y" and "Z", may conveniently be provided by a pair of integrated circuit chips such as the type CD4073B AND gate assemblies marketed by Radio Corporation of America. Associated with the outputs from inverters 194Q and 194R are diodes 200 and 202 respectively, while diodes 204, 206, 208, 210 and 212 are respectively associated with the outputs of the AND gates 196S, 196U, 198X, 198Y and 198Z. Supply voltage and ground connections may be made to the terminals "V" and "G" respectively of the chips 194, 196 and 198 as shown, but all of the logic relevant input and output connections thereto are separately shown in FIG. 2-b.

Considering first the detection of an out of lock or absence of frequency and phase synchronization and the generation of a transmit inhibit signal therefrom, it will be recalled that the comparator 40 at terminal 1 thereof (FIG. 2-a) presents to the connection lead 77 a signal voltage which is high whenever the previously described loop path is in locked synchronization with the frequency and phase provided to the comparator 40 as a reference from the oscillator 38, but which goes to a low potential condition whenever such lock or synchronization does not exist or is lost. That control signal is initially applied to a resistance-capacitance network involving a resistance 214 and a capacitance 216 coupled in series from the connecting lead 77 to the ground lead 163. The interconnection between the resistance 214 and the capacitance 216 is coupled via a lead 201 with the input of the inverter 194R, which inverts the polarity of the control signal and applies the inverted form thereof via a lead 203 to the diode 202, whose output is in turn coupled with the connecting lead 37. The signal thus applied to the connecting lead 37 from the diode 202 when the terminal 1 of the comparator 40 is producing an out of lock control signal is a transmit inhibit signal, as previously referred to, and is applied as a high level potential via the connecting lead 37 and/or lead 39 to the transmit-receive switch 30 and/or the transmitter 32, as previously described (see FIGS. 1 and 2-d). It will be understood that the diode 202 serves to isolate the output from the inverter 194R from the out of band detection circuitry next to be described and particularly that portion of the latter associated with the inverter 194Q and the diode 200, which is also coupled with the transmit inhibit connecting lead 37 to which a transmit inhibit signal may also be delivered via the inverter 194Q and the diode 200 in the event of detection of an out of band frequency selection.

The remaining components shown on FIG. 2-b are associated with the out of band detection function, and those skilled in the art will understand the numbers of such components and the interconnections therebetween will depend upon and may be modified to accommodate to the relationship between the particular range of frequency selection permitted by the digital frequency selection switch arrangement implemented for a given application and the particular sub-range thereof within which transmission is permissible in such application. Assuming those parameters to be as described for the illustrative preferred embodiment of a NAV/COM transceiver being considered as exemplary, however, it should first be recalled that the digital frequency selection switch 50 provides choices of values for the various digits permitting the selection of any frequency channel within the range of 100.000 MHz through 139.975 MHz and that reception is to be provided within the sub-range of 108.000 MHz through 135.975 MHz, whereas the channels upon which transmission is authorized are restricted to the sub-range from 118.000 MHz through 135.975 MHz. Since the selection switch 50 does not affect the value of the first or hundreds of MHz digit (which is fixed at "1"), permits the selection of values from "0" through "3" for the second or tens of MHz digit, permits the selection of values from "0" through "9" for the third or units of MHz digit, permits the selection of values from "0" through "9" for the fourth or tenths of MHz digit, and permits the selection of values from "00" through "75" for the fifth and sixth or hundredths and thousandths of MHz digits, it will be perceived that the particular out of band problem involved in the NAV/COM transceiver under consideration can be detected from reference to only the second or tens of MHz digit and the third or units of MHz digit. More specifically, an out of band frequency selection condition would occur if either (i) a value of "0" should be selected for the second or tens of MHz digit, or (ii) a value of "1" should be selected for the second or tens of MHz digit and a value of other than "8" or "9" should be selected for the third or units of MHz digit, or (iii) a value of "3" should be selected for the second or tens of MHz digit and a value of "6", "7", "8" or "9" should be selected for the third or units of MHz digit. It is these criteria that are implemented in the logic circuitry of the out of band detection logic circuitry 52 shown in FIG. 2-b.

As a prelude to explaining the manner in which the detection logic circuitry 52 implements testing for an out of band frequency selection in accordance with those criteria, it will be helpful to note that, pursuant to the encoding scheme utilized, the presence of a signal on line 79A corresponds to a "2" and the presence of a signal upon the line 79B corresponds to a "1" in the second or tens of MHz digit of the selected frequency; thus, with no signal present upon either of line 79A and 79B (as would be the case with both of switches 50a and 50b left open) the second digit of the frequency will be "0", with a signal present on line 79B but not on line 79A the second digit will be a "1", with a signal present on line 79A but not on line 79B the second digit will be a "2", and with signals present upon both of lines 79A and 79B (switches 50a and 50b both closed) the second digit of the selected frequency will be a "3". Similarly, the lines 79C, 79D and 79E respectively correspond to the presence (in an additive sense) of values of 8, 4 and 2 in the third digit of the selected frequency, so that, for example, with a signal applied only to the line 79C the third digit would be an "8", with signals applied to lines 79D and 79E but not 79C the third digit would be a "6", etc. It will next be noted that the "2" signal on lead 79A, when it is present and thereby indicating an additive factor of "20" MHz in the selected frequency, is fed to an input of each of the AND gates 198Y and 198Z and is also fed to the inverter 194M to provide from the latter an inverted output of "NOT 20", which is fed via the lead 279A to one of the inputs of the AND gate 198X. Similarly, a signal present upon the lead 79B, representing an additive factor of "10" MHz in the selected frequency is fed to respective inputs of the AND gates 198X and 198Y, but is also fed to the inverter 194N, which produces a "NOT 10" signal that is delivered via the lead 279B to the AND gate 198Z. The lead 79C, representing the presence of an additive factor of "8" MHz, is applied as an input to the AND gate 198X and also as an input to the AND 196S. A signal upon the lead 79D, representing a factor of "4" MHz in the selected frequency, is applied as an input to the AND gate 196U. A signal upon the lead 79E, representing the presence of an additive factor of "1" MHz in the selected frequency, is applied as an input to the AND gate 196U. Two of the inputs of the AND gate 196S and one of the inputs of the AND gate 196U are fixed at a high signal level by a lead 205 coupled with the positive lead 161; and one of the inputs of the AND gate 198Z is similarly fixed at a positive level by the lead 207 coupled with the positive lead 161. The outputs of AND gates 196S and 196U are "hard wired ORed" through the isolating diodes 204 and 206 by a lead 209 coupled with the input of the inverter 194P, whose inverted output is in turn coupled via the lead 211 with one of the inputs of the AND gate 198Y. The outputs of the gates 198X, 198Y and 198Z are similarly "ORed" via the respective isolating diodes 208, 210 and 212 by a lead 213 coupled with the input of the inverter 194Q, whose inverted output to lead 215 is fed through the isolating diode 200 to the transmit inhibit lead 37 and represents the transmit inhibit signal resulting from detection of an out of band condition. The inputs of the respective AND gates 196S, 196U, 198X, 198Y and 198Z are labelled with the "values" of the input supplied thereto (when the latter are present) in terms of either the additive factor in MHz represented thereby or the absence of such factor for "NOT values" and by "+'s" for those inputs that are fixed at a positive value; and that input of the AND gate 198Y which represents a more complex function of "values" derived via lead 211 from the inverter 194P, is labelled "W" and will be further described.

The absence of an out of band frequency selection condition is indicated by the ANDing condition for any one of the gates 198X, 198Y or 198Z being satisfied, whereupon its output potential goes to a high level and is fed to the input of the inverter 194Q via the lead 213, which in turn inverts such signal to a low potential level coupled to the lead 37, via the diode 200, thereby representing the absence of an out of band detection generated transmit inhibit signal on the lead 37. Conversely, detection of an out of band frequency selection condition is manifested by the ANDing condition not being satisfied for any one of the gates 198X, 198Y and 198Z, in which case the low level potential from all of their outputs is conveyed to the input of the inverter 194Q, which then inverts such input into a high potential level output fed via the diode 200 to the lead 37 to present an out of band detection generated transmit inhibit signal on the lead 37. The isolating diodes 200 and 202 interposed between the outputs of the inverters 194Q and 194R respectively and the transmit inhibit signal lead 37, of course, provide the combining logic 54 identified in FIG. 1 in a form amounting to "hard wired ORing" for simplicity.

The manner in which the three above described criteria for testing for an out of band frequency selection are accomplished by the described logic circuitry should now be apparent to those skilled in the art from FIG. 2-b, but may be summarized as follows. The test for an out of band frequency selection involving the choice of a "0" in the second or tens of MHz digit is implemented by the AND gates 198X, 198Y and 198Z. Since the selection of a "0" for the second or tens of MHz digit would imply that neither "10" nor "20" had been selected for that digit, and since each of the gates 198 requires the selection of one or the other of the latter, it will be clear that, upon selection of "0" for the second or tens of MHz digit, none of the gates 198X, 198Y and 198Z will be producing a high potential signal representing satisfaction of its AND condition, so that the input upon lead 213 to the inverter 194Q will be at a low potential and would provide the high level potential output at its lead 215 representing detection of an out of band condition and production of a transmit inhibit signal. The second test criteria is that an out of band condition should be indicated whenever a value of "1" is selected for the second or tens of MHz digit (i.e., "10") and a value of other than "8" or "9" is selected for the third or units of MHz digit. The last mentioned test is performed primarily by the gate 198X, since the gate 198Y implies a selection of "30" (i.e., "10" and "20") and the gate 198Z implies a selection of "20". When a high level input is applied to the gate 198X via the lead 79B representing the selection of "10", and is accompanied by a high level potential upon lead 279A representing a "NOT 20" selection, in order for the AND condition of gate 198X to be satisfied to avoid an out of band detection a high level potential must also be applied via input lead 79C. Since with the binary coded decimal encoding used for the third or units of MHz digit, a high level potential representing an additive factor of "8" will be present upon the lead 79C whenever an "8" or a "9" is selected, but not when any of the other digits "0" through "7" is selected for the units of MHz digit, it will be clear that selections of frequency for transmit mode are permitted to have a MHz value of either 118 or 119, but that a frequency selection having a MHz value of 100 through 117 would prevent the ANDing condition of the gate 198X from being satisfied and would result in generation of a transmit inhibit signal. The third test for an out of band selection looks for a choice of any value in excess of "5" for the third or units of MHz digit in combination with a choice of "3" for the second or tens of MHz digit. This test is primarily implemented by the gate 198Y in conjunction with the gates 196S and 196U and the inverter 194P. The gates 196 will present a high potential input at lead 209 of the inverter 194P if either the signal at input lead 79C of gate 196S indicates that a selection involving the additive factor of "8" has been made for the units of MHz digit or if signals are present upon input leads 79D and 79E of gate 196U indicating that a unit of MHz digit selection has been made which involves additive factors of both "4" and "2". With the encoding used, this means that a high level signal will be presented to the input 209 of the inverter 194P whenever the units of MHz digit selection is "6", "7", "8" or "9". After inversion of such signal by the inverter 194P, there is applied to the input 211 of the AND gate 198Y a signal labelled "W" having the logic function NOT ("2" and "4") and NOT "8". Thus, the ANDing condition for the gate 198Y will be satisfied whenever a value of "3" is selected for the tens of MHz digit ("10" plus "20") and a value of less than "6" is selected for the units of MHz digit, which would be a proper transmit mode frequency selection, but would not be satisfied by selection of a units of MHz digit of "6" or more and would then exhibit the low potential level output needed to provide after inversion by the inverter 194A the applicable transmit inhibit signal upon lead 37. It will be apparent to those skilled in the art that differing types of logic gates and interconnections thereof could be equivalently employed for invoking the necessary criteria required for the preferred embodiment, and that different kinds or/and arrangements of logic gates might be needed for implementing the out of band detection logic needed for handling other parameters of permitted range of frequency of selection and permitted range of authorized transmission, but the out of band detection logic 52 disclosed herein for use with the preferred NAV/COM receiver and embodiment will serve to demonstrate how equivalent forms of logic circuitry 52 may be implemented for other applications.

Frequency Selection—Derivation of Desired Harmonic by Filtering and Amplifying

Reference is next made particularly to the lower portion of FIG. 2-d upon which the preferred form of filter amplifier 56 is illustrated. It will be recalled that the frequency significant input to the filter amplifier 56 via the lead 67 ranges from 11.800 MHz through 13.5975 MHz for transmit mode and from 11.870 MHz through 14.675 MHz for receive mode, but that the outputs needed from the filter amplifier 56 are an excitation signal via the lead 43 to the transmitter 32 ranging from 118.000 MHz through 135.975 for transmit mode and an "external local oscillator" injection signal via the lead 45 to the receiver 34 ranging from 118.700 MHz through 146.675 MHz in receive mode (in order to tune from 108.000 MHz through 135.975 MHz with conversion to a first intermediate frequency of 10.700 MHz). It will be perceived, therefore, that there is a full "order of 10" difference between the frequency range of the input available to the filter amplifier 56 via the lead 67 from the voltage controlled oscillator 42 and the outputs required from the filter amplifier 56 by the transmitter 32 and the receiver 34 via the leads 43 and 45 respectively. Accordingly, it will be understood that the function of the filter amplifier 56 is to extract and amplify the tenth harmonic component of the input signal upon lead 67 (which may range from 11.800 MHz through 14.675 MHz as the voltage controlled oscillator 42 is tuned by the variable level voltage from output lead 59 of the comparator 40), in order to provide outputs upon leads 43 and 45 ranging from 118.000 MHz through 146.750 MHz. It will be further apparent that realization of such function of the filter amplifier 56 involves three significant further considerations, namely, that, despite the "order of 10" difference in the frequencies at which the oscillator 42 and the filter amplifier 56 will be operating at any given time, they will need to properly "track" with each other as they are tuned; that, if both the oscillator 42 and the filter amplifier 56 are desirably to be electronically tuned and in response to the same variable level voltage from the comparator 40, special provision will need to be made to accomplish such tracking as they are tuned to their various corresponding, but widely differing, operating frequencies; and that, since a relatively wide range of frequencies are to be handled by the filter amplifier 56, the interstage coupling between the tuned circuits employed for filtering will need to be optimized over a wide frequency band.

Circuits for frequency selective filtering and amplification of an input signal employing successive stages having transistor or other active amplifying elements intercoupled with each other in cascade fashion by means of mutually coupled inductances of frequency selective tuned inductance-capacitance assemblies are, of course, old and well known to those skilled in the art, in a general sense. Accordingly, in describing the improved filter amplifier 56 provided by this invention, emphasis will be given primarily to those features of the construction which are regarded as non-conventional and contributing to the versatile adaptability of the improved filter amplifier 56 that permits it to cope with the special problems presented in most efficiently implementing the preferred embodiment of NAV/COM transceiver being described for illustration, but which features are also believed for provide improvements having utility in other specific applications. The active transistor amplifier elements employed in the four stages of the filter amplifier 56 are identified by the reference numerals 300, 302, 304 and 306. The output of the first stage employing the element 300 is coupled to the input of the second stage employing the amplifier element 302 solely by means of mutual inductive coupling indicated by the dotted line 308 between a secondary winding 310 of an output transformer of the first stage (also having a primary winding 312) and a primary winding 314 of an input transformer of the second stage (also having a secondary winding 316). The output of the second stage employing amplifier element 302 is similarly coupled to the input of the third stage employing the amplifier element 304 solely by means of mutual inductive coupling as at 308' between output transformer secondary winding 310' and input transformer primary winding 314', and transformer windings 310" and 314" are similarly mutually coupled as at 308" between the third and fourth stages respectively employing the amplifier elements 304 and 306. The manner of accomplishing such mutual couplings 308, 308' and 308" in a fashion that has been discovered to uniquely optimize the efficiency of the required coupling over the unusually wide range of frequency to be handled by the filter amplifier 56 will be subsequently described in greater detail with reference to FIGS. 3–6 inclusive.

Each of the radio frequency transformers employed for interstage coupling between the amplifier elements 300, 302, 304 and 306 is essentially identical and involves, as illustrated by specific reference to the coupling between the elements 300 and 302, a primary winding 312 interposed in the output lead 301 of the element 300 that is inductively coupled in the usual fashion with an associated secondary winding 310 having a permeable tuning core provided for trimming purposes as indicated by the arrow 303. The end of the primary winding 312 into which operating power is introduced via the lead 305, the resistance 307 and the resistance 309 leading to the power lead 161 is bypassed to the ground lead 193 via a capacitance 311 and a lead 313. Coupled in parallel with the secondary winding 310 for tuning the same to parallel resonance is a padding capacitance 318 and a varactor voltage controlled reactance component 320. One end of the winding 310, the capacitance 318 and the varactor 320 are grounded by a lead 313. The variable level tuning voltage from the comparator 40 is fed via the lead 69 and through a resistance 322 to the control terminal of the varactor 320. The inductive reactance at which the winding 310 is trimmed by core 303, the value of the padding capacitance 318 and the type of varactor 320 employed (which should preferably be of the same type as the varactor 124 utilized in the voltage controlled oscillator 42) are selected in accordance with known reactance relationships to provide the required tuning of parallel resonance of the secondary winding 310 as the variable level tuning voltage upon lead 69 is changed within the range of permitted variation thereof, so as to cause the frequency of parallel resonance of the described frequency controlling output circuit of the amplifier element 300 to change at a rate ten times faster than that of the series resonant frequency controlling circuit 116, 124, etc. of the voltage controlled oscillator 42 for a given incremental change in the level of the tuning voltage from the comparator 40, it being understood that the frequency of parallel resonance to which the output tank circuit of the amplifier element 300 is thus tuned will be exactly ten times the frequency of series resonance to which the frequency controlling tank circuit of the voltage controlled oscillator 42 is tuned by the same tuning voltage. In this manner, the required tracking between the local oscillator 42 and each of the successive inter-stage couplings within the filter amplifier 56 is achieved through the use of the described arrangements employing varactors as at 124 and 320 as the primary, tunable frequency controlling components. It is also significant to note that the type of optimized mutual coupling 308 from the output tank circuit of each stage to the input tank circuit of the following stage within the filter amplifier 56 is believed to contribute to the very high degree of tracking accuracy achieved, by virtue of not significantly interfering with the tuning action of the varactors 320, 320' in the manner that would be expected if other forms of interstage coupling were employed. The associated input tank circuit of the amplifier element 302 will be seen from FIG. 2-d to be in all respects similar to that described for the amplifier element 300, except, of course, that the winding 314 tuned to parallel resonance by the varactor 320' is a primary winding, the associated winding 316 is a secondary winding, and the winding 316 is connected with the base of the amplifier element 302 by a lead 317, whereas the winding 312 is coupled with the collector of the amplifier element 300 by a lead 301. The other interstage output and input tank circuits of the filter amplifier 56 and the method of tuning the same by means of varactors respectively associated therewith are the same and will not be iteratively redescribed.

Although more or less conventional, a few additional details of the circuitry of the first three stages of the filter amplifier 56 may be noted in passing. The frequency significant input from the local oscillator 42 is applied to the base of the amplifier element 300 from the lead 67, and the base of the element 300 is also coupled with the ground lead 163 through a base resistance 324 and a capacitance 326, as well as with the positive supply lead 161 through a base biasing resistance 328 and the previously mentioned resistances 307 and 309. The emitter of the element 300 is connected with the ground lead 163 via a lead 319. Proceeding to the input circuit of the amplifier element 302, the secondary winding 316 applies its input via the lead 317 to the base of the element 302, biasing for the base of the element 302 is provided through resistances 330 and 332 and the previously mentioned resistance 309 from the positive lead 161, and bypassing to the ground lead 163 is provided by a capacitance 334. The emitter of the amplifier element 302 is coupled with the ground lead 163 via a lead 321, the collector thereof is coupled with the primary winding 312' of the output tank circuit via a lead 323 and with the positive supply lead 161 via the previously mentioned resistances 332 and 309, as well as being bypassed to the ground lead 163 by a capacitance 336 and lead 325. The input from the secondary winding 316' of the radio frequency input tank circuit of the amplifier element 304 is applied to its emitter via a lead 327, the base of the element 304 is coupled to ground via a capacitance 338, and the primary winding 312" is coupled with the collector of the element 304 via a lead 329. The collector of the amplifying element 304 is coupled with the positive supply lead 161 via winding 312" and resistances 340 and 342, and the base thereof is coupled with the positive lead 161 via resistance 344 and resistances 340 and 342. Bypassing to ground lead 163 is provided from the positive lead 161 by capacitance 346, from the interconnection between resistances 340 and 342 by capacitance 348, and from the end of winding 312" remote from the collector by capacitance 350. The tuning voltage lead 69 is also bypassed to the ground lead 163 as by capacitances 352 and 354. It may be noted, to illustrate that the frequency controlling and coupling techniques advantageously provided in the filter amplifier 56 are not dependent upon the particular type of transistor amplifying arrangement used in the individual stages, that the stages incorporating amplifier elements 300, 302 and 306 are implemented in the preferred embodiment chosen for illustration as of common emitter configuration, while the stage incorporating amplifier element 304 is of common base configuration.

Certain connections between the final amplifier stage incorporating the amplifier element 306 and other parts of the apparatus merit separate discussion. The emitter of the amplifier element 306 is grounded via leads 333, 335 and 337 to ground lead 163. The input to the base of the element 306 is derived from one end of the secondary winding 316" of the tuned input tank circuit via the lead 339 and resistance 356, and the other end of the winding 316" is bypassed to the ground lead 163 via a capacitance 358. Since the further amplification provided by the final stage employing the element 306 is needed only in supplying excitation to the transmitter 32, but not for the "external local oscillator" signal to be supplied to the receiver 34 from the filter amplifier 56, the latter signal is taken from the "input side" of the element 306, specifically via a lead 341 and a coupling capacitor 360 from the lead 337 between winding 316" and base resistance 356 to the lead 45 connected with the "local oscillator" injection input terminal of the receiver 34 labelled "LO" in FIG. 2-d. Note that this manner of deriving the "local oscillator" input for the receiver 34 renders the same independent of whether the element 306 is operating in an amplifying mode (which, as will next be explained, it is not when the apparatus is in receive mode), but still takes advantage of the additional frequency selectivity provided by the sixth tuned tank circuit involving the windings 314" and 316", which is significant when it is remembered that the desired output to the rceiver 34, which should be as free from other signals as feasible, is being derived at a frequency equal to the tenth harmonic of the initial input signal to the filter amplifier 56 (that inherently included other harmonic components initially stronger than the tenth harmonic component). The tuning frequency control voltage supplied to the receiver 34 at the terminal labelled "TF" in FIG. 2-d is, of course, derived from the variable tuning voltage lead 69 via a direct extension lead 47. The output circuit for the amplifier element 306 includes a radio frequency output transformer, which may be untuned, having a primary winding 362 inductively coupled with a secondary winding 364. One end of the winding 363 is coupled with the collector of the element 306, and the other end of winding 362 and the opposite end of winding 364 are coupled with the lead 43 by which the excitation frequency signal is applied to the transmitter 32 at the input terminal thereof labelled "F".

As those skilled in the art will appreciate, however, no means has thus far been described either for providing any direct current operating potential to the collector of the amplifying element 306 or any direct current biasing potential for the base of the element 306, without which it cannot effectively operate in an amplifying mode to provide any significant signal to the transmitter 32 via the lead 43. In the preferred embodiment of the NAV/COM transceiver being described for illustration, an operating supply voltage is to be derived when the apparatus is in transmit mode from a transmit enable voltage terminal labelled "TV" in the transmit-receive switch block 30, not only for the transmitter 32 itself via lead 33, but also for the final stage of the filter amplifier 56 via the lead 51. Tracing the latter circuit further as it appears in greater detail in FIG. 2-d, the transmit enable voltage lead 51 proceeds via a resistance 366, a connecting lead 343, a resistance 368 and a lead 345 to the other end of the secondary winding 364, thence through the latter and the primary winding 362 to provide an operating potential at the collector of the amplifier element 306. The same potential source is coupled from the interconnection between the resistance 368 and the lead 345 with the base of the element 306 through a circuit path traceable through a resistance 370, the secondary winding 316" of the input tank circuit for the element 306, lead 339 and resistance 356 to provide to the base of the latter the biasing potential required for amplifying action thereof. Thus, the presence of the transmit enable voltage signal at terminal "TV" of the transmit-receive switch 30 is necessary for operation of either the transmitter 32 or the final amplifying stage of the filter amplifier 56 involving the transistor element 306, and such potential is also communicated via the lead 51 to the side step oscillator 36 for the previously described frequency selecting function that it performs within the oscillator 36.

It remains to identify certain further interconnections shown in FIG. 2-d. The receive enable voltage is depicted an emanating from the terminal labelled "RV" of the transmit-receive switch 30, from which it may be fed both to the receiver 34 via the connecting lead 35 and to the side step oscillator 36 via the connecting lead 53. The transmit inhibit signal is shown in FIG. 2-d as being not only fed to the input terminal of the transmit-receive switch 30 labelled "TI" from the lead 37, but is also depicted as optionally extended via a lead 39 from an output terminal "TI" of the transmit-receive switch 30 to an input terminal "TI" of the transmitter 32 itself, it being understood that the actual disablement of transmitting operation may be carried out within the circuitry of either the transmit-receive switch module 30 or the transmitter 32 or both. To illustrate that a common antenna 400 can be utilized for both transmission and reception and appropriately switched between connections of same with the transmitter 32 and the receiver 34, terminals respectively labelled "TA" and "RA" are depicted upon the transmit-receive switch 30 and shown as respectively coupled by a lead 401 with an antenna terminal "A" of the transmitter 32 and by a lead 403 with an antenna terminal "A" of the receiver 34. The terminal labelled "M" on the transmitter 32 represents the input point for intelligence signals such as modulating signals from a microphone used to control the content of the transmitted signal, although it will be understood that the transmitter 32 could be provided with keyed signals or the like, if desired. Similarly, the terminal labelled "O" on the receiver module 34 represents any suitable output of usable information from a received signal, such as that typically applied to a loud speaker or headphones, although such output signal could be utilized in various other fashions in specific applications different from the NAV/COM transceiver being considered for illustration.

The Improved Interstage Coupling

Reference is next made to FIGS. 3 through 6, wherein certain significant electro-mechanical details of the improved construction technique employed for effecting the mutual inductive couplings 308, 308', etc. between the winding pairs 310–314, 310'–314', etc. of the filter amplifier 56 are shown. The reasons why the improved coupling technique is as effective as it has been found to be in providing optimized coupling over the very wide band of frequencies that must be handled by the filter amplifier 56 is not fully understood. It is known, however, that the desired wide band coupling characteristics simply did not prove attainable with conventional techniques, and it is believed, therefore, that the surprisingly good results achieved with the coupling arrangement discovered after considerable effort and next described is probably attributable to some sort of criticality or synergism with respect to the relationships involved.

The radio frequency output circuit transformer windings 310 and 312, formed of conductive wire, are wound and mounted in the general manner illustrated upon an electrically insulative, upstanding, tubular, coil form 500 supported upon an insulative base 502, which is in turn mounted upon a printed circuit board or the like 504 by means of leads, as at 506 and 508, comprising extensions of the windings 310 and 312, passed through holes, as at 510, in the circuit board 504 and soldered to conductive terminal pads, as at 512, on the board 504. The windings 314 and 316 of the associated radio frequency input circuit transformer are formed and mounted in the same fashion upon a coil form 516 similarly supported upon the board 504 in adjacent, parallel relationship to the coil form 500. A permeable, ferrite, trimming core 303 is threadably mounted in each of the forms 500, 516 for adjustment relative to the associated windings. Each of the forms 500 and 516 and its associated windings is covered by a generally rectilinear shield can 518 or 520 respectively, which is formed of electrically conductive material such as aluminum and provided with downwardly extending tabs, as at 522 and 524, that pass through holes 526 in the board 504 and are physically and electrically connected to grounding pads 514 on the board 504. The bottoms of the cans 518 and 520 are open, and the top walls thereof may have an opening, as at 528, to clear an upper portion of the corresponding form 500 or 516. As thus far described, assuming the adjacent walls 530 and 532 were solid or uninterrupted, the construction would be more or less conventional, although there would, of course, be no mutual inductive coupling between the windings 310 and 314 because of the intervening shield walls 530 and 532 of the cans 518 and 520 (so that interstage coupling of some other type would necessarily have to be used).

In the improved construction, however, each of the walls 530 and 532 is centrally notched upwardly from its bottom to provide a pair of directly facing apertures 534 and 536 therein, which are of lesser width than the diameter of the windings 310 and 314 and extend both above and below the upper and lower turns of the windings 310 and 314. It is through the apertures 534 and 536 that the desired mutual coupling between the windings 310 and 314, and thereby between successive stages of the filter amplifier 56, occurs. It would seem that some inductive coupling would necessarily also occur between the windings 312 and 316, but, since they are essentially just coupling links to the associated transistor elements and, in the circuitry employed in the filter amplifier 56, would carry much lesser radio frequency potentials than the parallel resonance tuned windings 310 and 314, it appears that the significant mutual coupling that achieves the desired results in terms of optimized coupling over an unusually wide frequency range occurs between the windings 310 and 314.

Although such dimensions might well vary for other frequency bands of operation, and may also be restrictedly varied from those to be next indicated even for a frequency band extending over a range of about 30 MHz between about 115 MHz and 150 MHz, without full loss of benefits, it has been discovered through experimentation that the optimum wide band coupling characteristics were achieved for the band tuned by the described filter amplifier 56 when the spacing between the walls 530 and 532 is established at about 0.025 inch and the width of the apertures is established at about 0.132 inch; departures of more than 10% in either direction for either of such dimensions was found to substantially impair the wide band uniformity of coupling characteristics from the optimum obtainable with the stated parameters. Although apparently not as critical, it was found that a height of about 0.260 inch for the apertures 534 and 536 works well with the windings 310 and 314 being employed. Merely to provide further insight concerning the general sizing of the cans 518 and 520 and the other parts associated therewith, it is noted that the walls of the cans 518 and 520 utilized in the preferred embodiment were about 0.420 inch high and about 0.290 inch wide. As has best been determined experimentally, however, it appears that the more significantly critical dimensions are the spacing of the walls 530 and 532 and the widths of the apertures 534 and 536 presenting a "window" through which mutual coupling may occur, and that each of those dimensions has a tolerance of only about plus or minus 10% from the previously indicated values before a serious deterioration of coupling characteristics is experienced, as compared with those of the optimized construction.

The principles of the invention, as well as the construction and operation of an illustrative currently preferred embodiment thereof and application therefor, have been shown in the accompanying drawings and hereinabove explained with sufficient particularity to render the same clear to those skilled in the art. Those persons will, of course, appreciate that various details of construction and/or operation may be modified from those specifically disclosed as exemplary in relation to the preferred embodiment and application chosen for illustration, without departing from the essence and gist of the invention. Accordingly, it is to be understood that the invention should be deemed limited only by the fair scope of the claims which follow, when the latter are resonably interpreted to encompass manifest mechanical and electrical equivalents.

I claim:

1. In radio apparatus having—
  radio signal handling means adapted to have a frequency controlling signal applied thereto and operative to transmit or/and receive radio signals of selected frequency determined by and correlated in predetermined manner with the frequency of said frequency controlling signal,
  signal comparator means adapted to have a reference frequency signal of predetermined frequency and a comparable frequency signal applied thereto and operative to provide a signal of variable electrical, magnitude determined by and correlated in predetermined manner with the relationship between the frequencies of said reference frequency signal and said comparable frequency signal,
  reference signal producing means operative to provide said reference frequency signal and coupled with said comparator means for applying said reference frequency signal to said comparator means,
  frequency divider means adapted to have a digitally encoded control signal and a synchronization frequency signal applied thereto, operative to provide said comparable signal with the latter having a frequency equal to the frequency of said synchronization frequency signal divided by a numeric factor determined by said encoded control signal, and coupled with said comparator means for applying said comparable signal to said comparator means,
  frequency selecting means having a plurality of selectable conditions, operative to provide said encoded control signal in accordance with a selected condition of said selecting means, and coupled with said divider means for applying said encoded signal to said divider means,
  variable frequency signal producing means adapted to have said variable magnitude signal applied thereto and coupled with said comparator means for that purpose, and operative to provide a tunable frequency signal having a frequency determined by and correlated in predetermined manner with the magnitude of said variable magnitude signal, and
  loop path means adapted to have said tunable frequency signal applied thereto and coupled with said variable frequency signal producing means for that purpose, operative to provide said synchronization frequency signal, and coupled with said divider means for applying said synchronization frequency signal to said divider means,
  the improvement of which comprises the provision, in combination with the aforesaid, of:
  signal processing means, including filter amplifier means having frequency selective tank circuits tuned to a frequency equal to an harmonic of the frequency of said tunable frequency signal, coupled with said variable frequency signal producing means and said comparator means for respectively receiving said tunable frequency signal and said variable magnitude signal to produce said frequency controlling signal with the latter having a frequency equal to an harmonic of said tunable frequency signal, and coupled with said signal handling means for applying said frequency controlling signal to said signal handling means,
  whereby said signal handling means may be operated at a relatively high selected frequency, while said comparator means, said reference signal producing means, said frequency divider means, said variable frequency signal producing means and said loop path means are being operated at substantially lower frequencies.

2. In apparatus according to claim 1, wherein:
said variable magnitude signal provided by said comparator means is of variable voltage level correlated with the phase relationship, as well as the frequency relationship, between said comparable signal and said reference frequency signal.

3. In apparatus according to claim 1, wherein:
said reference frequency signal is of a frequency less than 0.01% of said selected frequency and less than 0.1% of the frequency of said tunable frequency signal.

4. In apparatus according to claim 1, wherein:
said variable frequency signal producing means includes variable frequency oscillator means having an oscillation frequency determining tuned circuit provided with a voltage controlled reactance component therein for tuning said circuit into series resonance in response to the level of said variable magnitude signal.

5. In apparatus according to claim 1, wherein:
said tank circuits are provided with reactance elements arranged to tune said tank circuits into parallel resonance at said harmonic of said tunable frequency signal.

6. In apparatus according to claim 5, wherein:

said elements are voltage controlled reactance components, and there are means for applying said variable magnitude signal to said components.
7. In apparatus according to claim 6, wherein:
said radio signal handling means includes receiving means adapted to be tuned by application of a variable level voltage thereto, and
there are provided means coupled with said receiver means for also applying said variable magnitude signal to said receiving means.

* * * * *